United States Patent [19]

Abe et al.

[11] Patent Number: 6,055,068
[45] Date of Patent: Apr. 25, 2000

[54] FACSIMILE APPARATUS WITH ENERGY AND INK CONSERVING FEATURES

[75] Inventors: Koichi Abe, Yokohama; Yuji Kurosawa, Tokyo, both of Japan

[73] Assignee: Canon Kabushiki Kaisha, Tokyo, Japan

[21] Appl. No.: 08/968,877

[22] Filed: Nov. 5, 1997

Related U.S. Application Data

[63] Continuation of application No. 08/432,719, May 2, 1995, abandoned.

[30] Foreign Application Priority Data

May 30, 1994 [JP] Japan .................................. 6-116721
May 9, 1994 [JP] Japan .................................. 6-119515

[51] Int. Cl.⁷ .............................. H04N 1/00; H04N 1/21; H04N 1/034; G03G 15/00
[52] U.S. Cl. ....................... 358/468; 358/401; 358/296; 399/25; 347/3
[58] Field of Search .................................. 358/400, 401, 358/296, 468, 502, 406, 442, 437; 399/1, 25, 34, 71; 347/3, 5, 22; 346/140.1

[56] References Cited

U.S. PATENT DOCUMENTS

| | | | |
|---|---|---|---|
| 4,772,900 | 9/1988 | Nagoshi | 346/140 R |
| 4,962,430 | 10/1990 | Hiroki et al. | 358/296 |
| 5,146,493 | 9/1992 | Kiguchi et al. | 379/357 |
| 5,168,291 | 12/1992 | Hiromatsu et al. | 346/140 R |
| 5,182,583 | 1/1993 | Horigome et al. | 346/140 R |
| 5,182,655 | 1/1993 | Motoyanagi | 358/406 |
| 5,189,527 | 2/1993 | Matsuda et al. | 358/440 |
| 5,282,054 | 1/1994 | Oana et al. | 358/406 |
| 5,325,209 | 6/1994 | Manabe | 358/437 |
| 5,475,404 | 12/1995 | Takahashi et al. | 347/23 |
| 5,475,500 | 12/1995 | Takeda | 358/401 |
| 5,528,376 | 6/1996 | Inoue et al. | 358/296 |
| 5,572,242 | 11/1996 | Fujii et al. | 347/23 |
| 5,831,646 | 11/1998 | Kuronuma et al. | 347/30 |

*Primary Examiner*—Kimberly A. Williams
*Attorney, Agent, or Firm*—Fitzpatrick, Cella, Harper & Scinto

[57] ABSTRACT

A facsimile apparatus includes a recording unit including an ink-jet recording apparatus for recording image data, a main power supply unit for supplying electric power, a central control unit, to which electric power is supplied from the main power supply unit, for controlling the operation of the entire apparatus, a main-power-supply control unit for controlling on/off operations of the main power supply unit, and a secondary battery unit, charged by the main power supply unit, for supplying the main-power-supply control unit with electric power. The apparatus is operable in an operational mode in which the main power supply unit is turned on by a starting signal output from the main-power-supply control unit, and the main power supply unit supplies a main body of the apparatus with electric power and charges the secondary battery unit, and a standby mode in which the main power supply unit is turned off and the secondary battery unit supplies the main-power-supply control unit with electric power. The main-power-supply control unit starts the main power supply unit in order to charge the secondary battery unit in the standby mode. When starting the main power supply unit in order to charge the secondary battery unit, a recovery operation of a head of the ink-jet recording apparatus is performed by suctioning or discharging ink within the head.

120 Claims, 18 Drawing Sheets

DETECTION OF PRESENCE (EXCHANGE) IF INK CARTRIDGE IN FAX STANDBY STATE

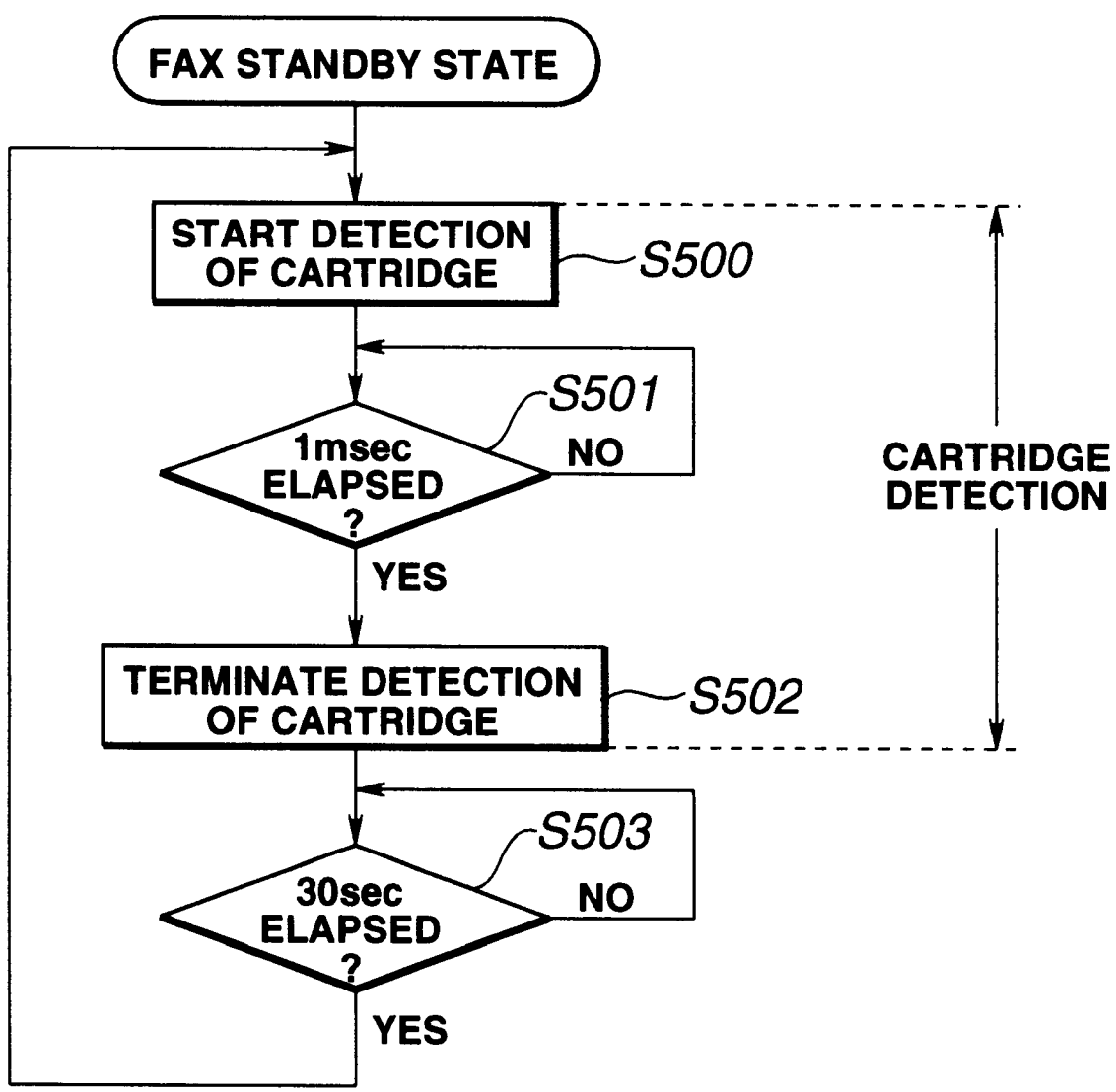

FACSIMILE APPARATUS WITH ENERGY AND INK CONSERVING FEATURES

This application is a continuation of Application Ser. No. 08/432,719 filed May 2, 1995, now abandoned.

BACKGROUND OF THE INVENTION

1. Field of the Invention

This invention relates to a facsimile apparatus having an automatic reception function, and more particularly, to a facsimile apparatus having ink-jet recording means.

2. Description of the Related Art

Some conventional facsimile apparatuses have an operational mode in which electric power is supplied to the entire apparatus when performing an operation, such as transmission, reception, copying or the like, and a standby mode in which electric power is supplied to only minimum necessary portions of the apparatus and is not supplied to unnecessary portions.

On the other hand, an ink-jet recording apparatus is provided in some conventional facsimile apparatuses.

Due to the configuration of the ink-jet recording apparatus, ink easily solidifies to clog a head. Hence, it is necessary to perform a recovery operation of preventing clogging of the head by suctioning or discharging the ink within the head at least at a certain time interval.

Accordingly, in a facsimile apparatus having the operational mode and the standby mode and having an ink-jet recording apparatus, when a recovery operation must be performed in the standby mode, the mode must be switched to the operational mode only for performing the recovery operation, thereby increasing electric power consumption.

Furthermore, in the ink-jet recording apparatus, when an ink cartridge has been exchanged, a large recovery operation in which a larger amount of ink than in an ordinary recovery operation is suctioned or discharged must be performed.

Since electric power is not supplied to the ink-jet recording apparatus in the standby mode, it is impossible to detect whether or not the ink cartridge has been exchanged.

Accordingly, since there is the possibility that the ink cartridge has been exchanged during the standby mode, in order to perform a secure recording operation, a large recovery operation must be performed every time the mode has been switched from the standby mode to the operational mode.

This causes consumption of a large amount of ink, and therefore an amount which can be recorded by one ink cartridge is greatly reduced.

SUMMARY OF THE INVENTION

The present invention has been made in consideration of the above-described problems.

It is an object of the present invention to improve a facsimile apparatus having the operational mode and the standby mode.

It is another object of the present invention to improve a facsimile apparatus including an ink-jet recording apparatus.

It is still another object of the present invention to provide a facsimile apparatus whose electric power consumption during the standby mode can be reduced.

It is yet another object of the present invention to provide a facsimile apparatus in which when an ink cartridge has been exchanged during a standby state, a large recovery operation can be performed before performing the subsequent recording operation.

According to one aspect, the present invention, which achieves these objectives, relates to a facsimile apparatus comprising recording means including an ink-jet recording apparatus for recording image data, main power supply means for supplying electric power, central control means, to which electric power is supplied from the main power supply means, for controlling operations of the entire apparatus, main-power-supply control means for controlling on/off operations of the main power supply means, and secondary battery means, charged by the main power supply means, for supplying the main power supply control means with electric power. The apparatus is operable in an operational mode in which the main power supply means is turned on by a starting signal output from the main-power-supply control means, and the main power supply means supplies a main body of the apparatus with electric power and charges the secondary battery means, and a standby mode in which the main power supply means is turned off and the secondary battery means supplies the main-power-supply control means with electric power. The main-power-supply control means selectively starts the main power supply means in order to charge the secondary battery means in the standby mode. When starting the main power supply means in order to charge the secondary battery means, a recovery operation of a head of the ink-jet recording apparatus is performed by suctioning or discharging ink within the head.

According to another aspect, the present invention relates to a facsimile apparatus comprising main power supply means for supplying electric power, central control means to which electric power is supplied from the main power supply means, main-power-supply control means for performing on/off control of the main power supply means, secondary battery means, charged by the main power supply means, for supplying the main-power-supply control means with electric power, an ink cartridge for recording image data and cartridge detection means for detecting mounting or detaching of the ink cartridge. The facsimile apparatus is operable in a standby mode in which the main power supply means is turned off and the secondary battery means supplies the main-power-supply control means with electric power, and an operational mode in which the main power supply means charges the secondary battery means. The cartridge detection means effect detecting of mounting or detaching of the ink cartridge in the standby mode.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 18 is a flowchart illustrating timing of detection of an ink cartridge in a facsimile standby state in the second embodiment.

DETAILED DESCRIPTION OF THE PREFERRED EMBODIMENTS

First Embodiment

A description will be provided of a first embodiment of the present invention with reference to the drawings.

Figure 1:
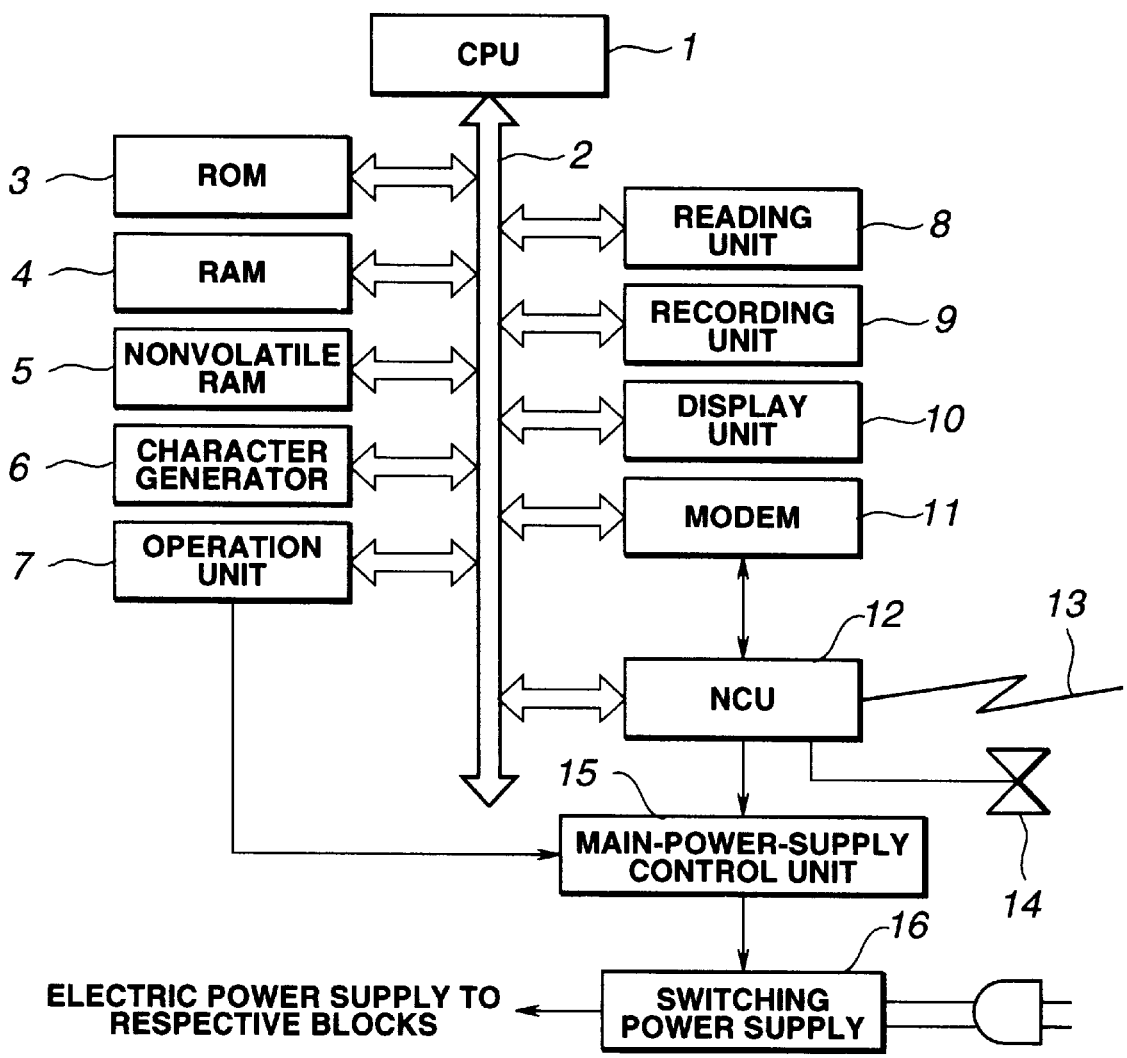
FIG. 1 is a schematic block diagram illustrating the configuration of a facsimile apparatus according to a first embodiment of the present invention.

FIG. 1 is a schematic block diagram illustrating the configuration of a facsimile apparatus according to the first embodiment.

In FIG. 1, reference numeral 1 represents a CPU comprising a microprocessor or the like. A ROM (read-only memory) 3, a RAM (random access memory) 4, a nonvolatile RAM 5, a character generator 6, an operation unit 7, a reading unit 8, a recording unit 9, a display unit 10, a modem 11, and a network control unit (NCU) 12 are connected to the CPU 1.

The NCU 12 is connected to a telephone line 13 and a telephone set 14, and also to a main-power-supply control unit 15. The main-power-supply control unit 15 is connected to a switching power supply (main power supply) 16 for supplying the above-described respective components with electric power.

The CPU 1 controls the operations of these components in accordance with programs stored in the ROM 3. The RAM 4 stores binary image data read by the reading unit 8 or binary image data recorded by the recording unit 9. The image data stored in the RAM 4 is output to the telephone line 13 via the modem 11 and the NCU 12. The RAM 4 also stores binary data input from the telephone line 13 and demodulated by the NCU 12 and the modem 11.

The nonvolatile RAM 5 stores data to be stored (such as abbreviated dial numbers and the like) even in a state in which the power supply of the facsimile apparatus is disconnected. The character generator 6 comprises a ROM for storing characters based on JIS (Japan Industrial Standards) codes, ASCII (American Standard Code for Information Interchange) codes and the like, and supplies character data under the control of the CPU 1 whenever necessary.

The operation unit 7 includes keys for starting transmission, reception and the like of an image, mode selection keys for assigning an operational mode in transmission or reception, such as fine, standard, automatic reception or the like, ten keys or one-touch keys for dialing, and the like. Upon depression of at least one of these keys, an onsignal is supplied to the main-power-supply control unit 15 and the CPU 1.

The reading unit 8, comprising a DMA (direct memory access) controller, an image processing IC (integrated circuit), an image sensor, a CMOS (complementary metal-oxide semiconductor) logic IC and the like, performs a binarycoding operation of data read utilizing a contact sensor under the control of the CPU 1, and sequentially transmits the obtained binary data to the RAM 4. An original is set relative to the reading unit 8 so as to be detectable by a mechanical original-sensor provided in a conveying path of the original. The obtained original-detection signal is supplied to the main-power-supply control unit 15 and the CPU 1.

The recording unit 9, comprising a DMA controller, an ink-jet recording apparatus, a CMOS logic IC and the like, takes out recorded data stored in the RAM 4 under the control of the CPU 1, and outputs and records the data in the form of a hard copy. In order to prevent clogging of the head, the ink-jet recording apparatus of the present embodiment must perform an operation of sucking or discharging ink within the head at least once in 72 hours (the operation being termed a "recovery operation"). The recovery operation must always be performed immediately before performing a recording operation.

The display unit 10 comprises a liquid-crystal display unit for performing a 16-digit display operation, and displays characters and the like under the control of the CPU 1.

The modem 11, comprising a G3/G2 modem device, a clock-signal generation circuit connected thereto, and the like, modulates data stored in the RAM 4 to be transmitted under the control of the CPU 1, and outputs the modulated data to the telephone circuit 13 via the NCU 12. The modem 11 also receives an analog signal from the telephone line 13 via the NCU 12, demodulates the analog signal, and stores the demodulated signal in the RAM 4.

The NCU 12 connects the telephone line 13 either to the side of the modem 11 or to the side of the telephone set 14 by performing a switching operation under the control of the CPU 1. The NCU 12 includes means for detecting a ringing signal (CI), and transmits a call-reception signal to the main-power-supply control unit 15 and the CPU 1 when a ringing signal has been detected.

The telephone set 14 is integrated with the main body of the facsimile apparatus. More specifically, the telephone set 14 comprises a handset, a speech network, a dialer, ten keys, one-touch keys and the like.

The main-power-supply control unit 15, comprising a one-chip microprocessor, a capacitor-type secondary battery and the like, controls electric power supply to the respective components of the entire facsimile apparatus, and can be operated only by electric power supplied from the secondary battery. When an original-detection signal from the reading unit 8, a call-reception signal from the NCU 12, or an on-signal from at least one of the keys on the operation unit 7 has been input, the main-power-supply control unit 15 transmits a starting signal to the switching power supply 16.

The switching power supply 16, which is an AC-input switching power supply, can perform on/off control of electric power supply to the respective components so as to supply or stop to supply electric power to the respective components in response to a start signal or a stop signal from the main-power-supply control unit 15, respectively.

Figure 2:
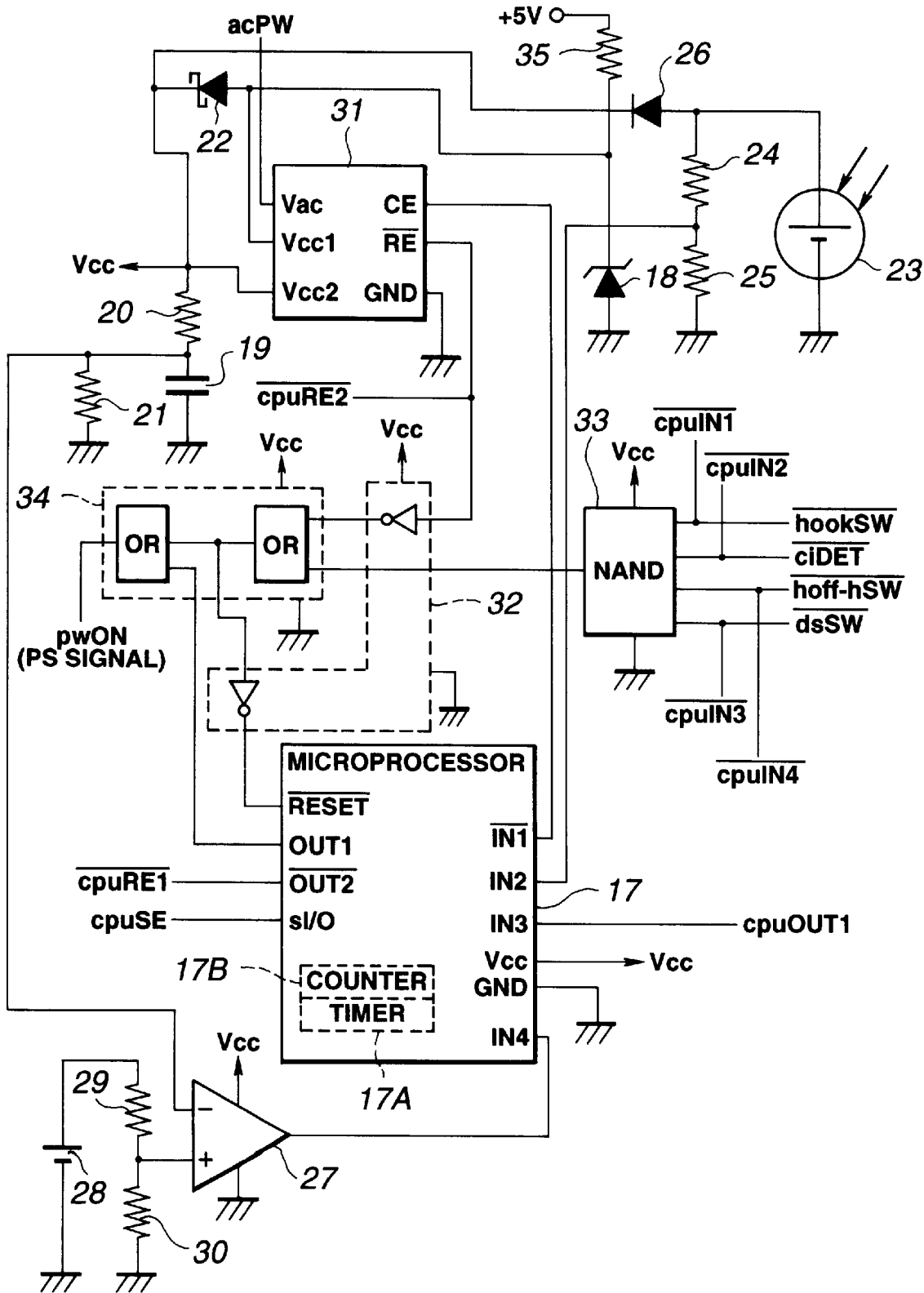
FIG. 2 is a schematic diagram illustrating the configuration of circuitry of a main-power-supply control unit shown in FIG. 1.
Figure 3:
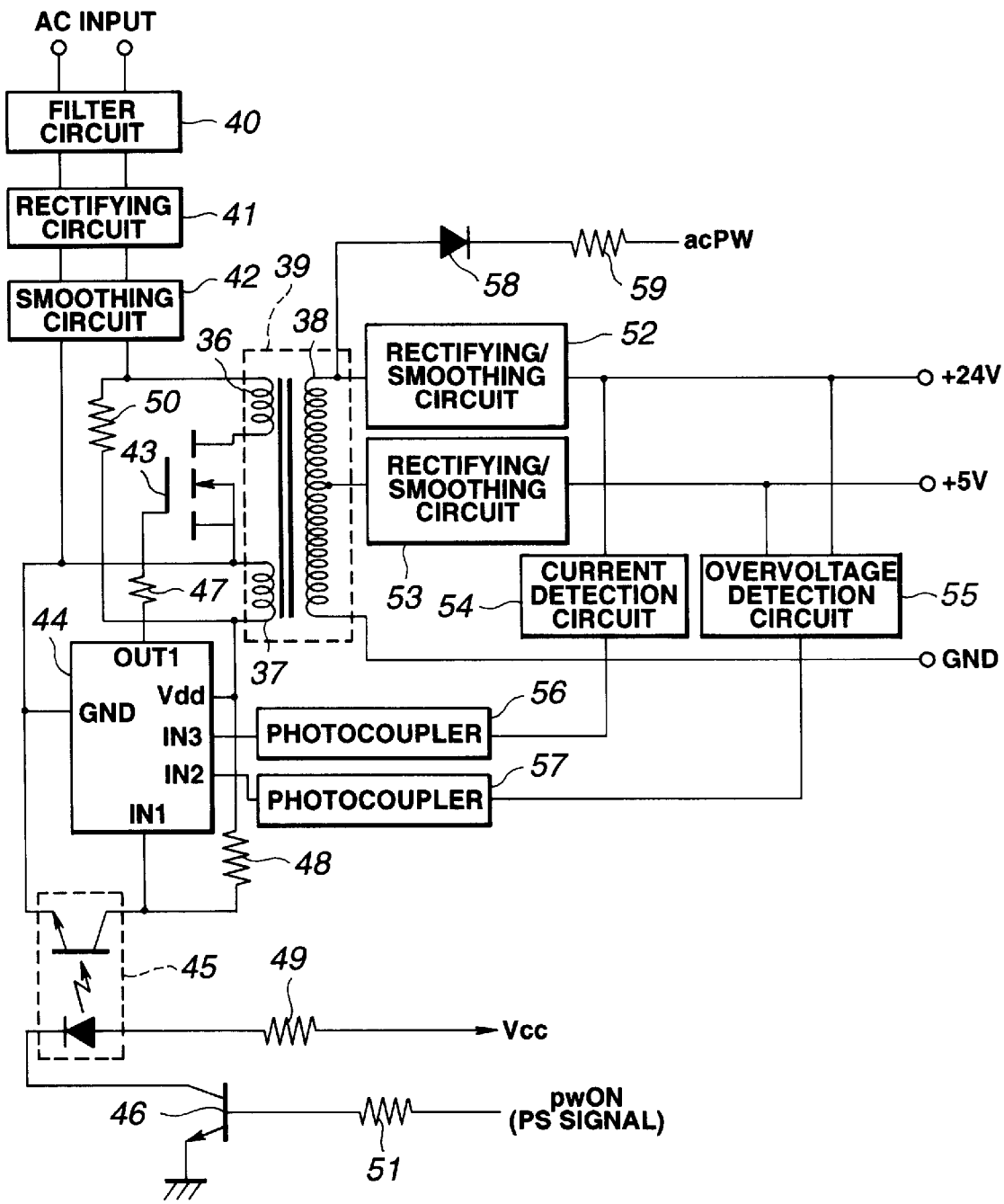
FIG. 3 is a schematic diagram illustrating circuitry of a switching power supply shown in FIG. 1.
Figure 4:
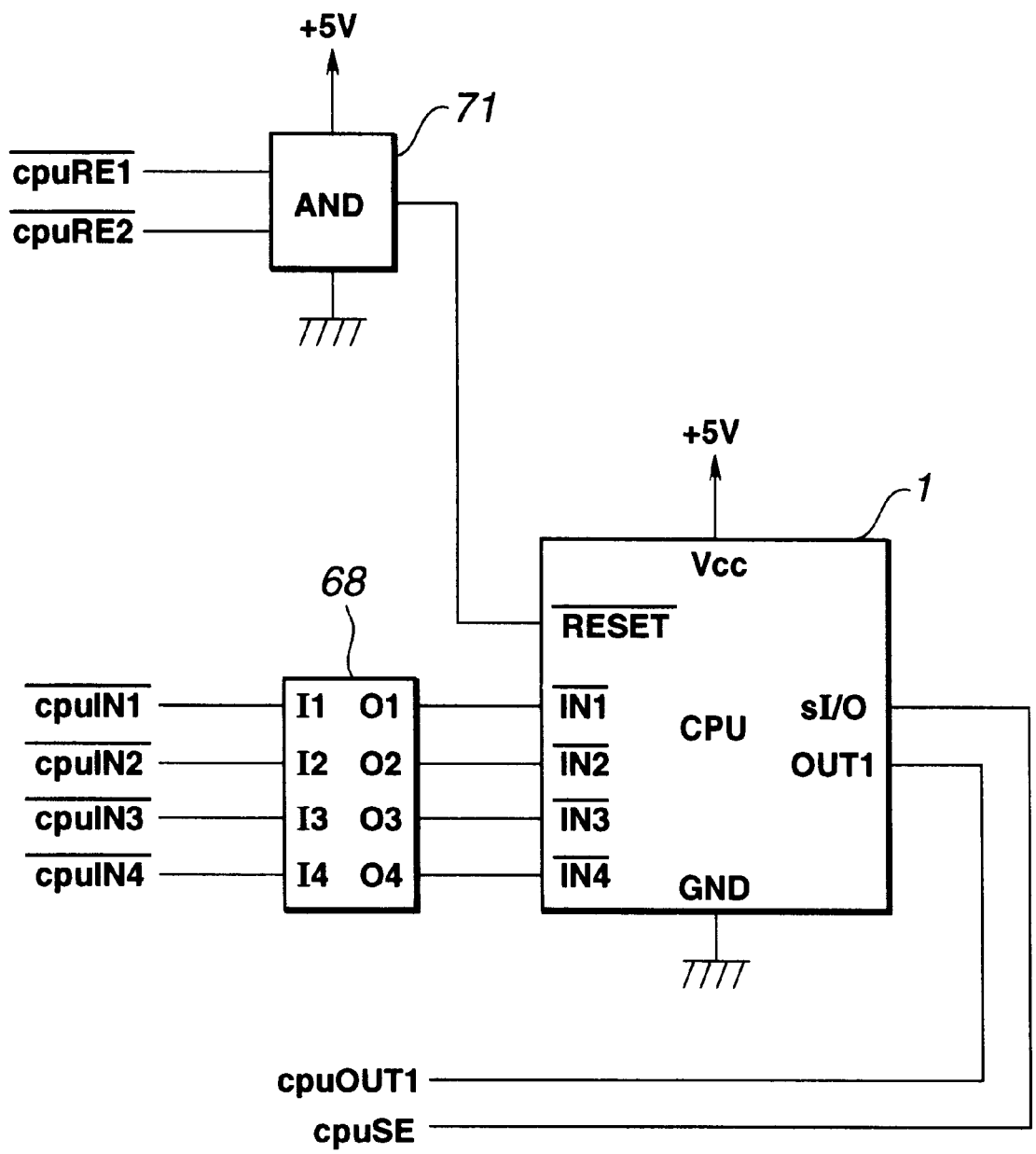
FIG. 4 is a schematic diagram illustrating circuitry around a CPU (central processing unit) shown in FIG. 1.
Figure 5:
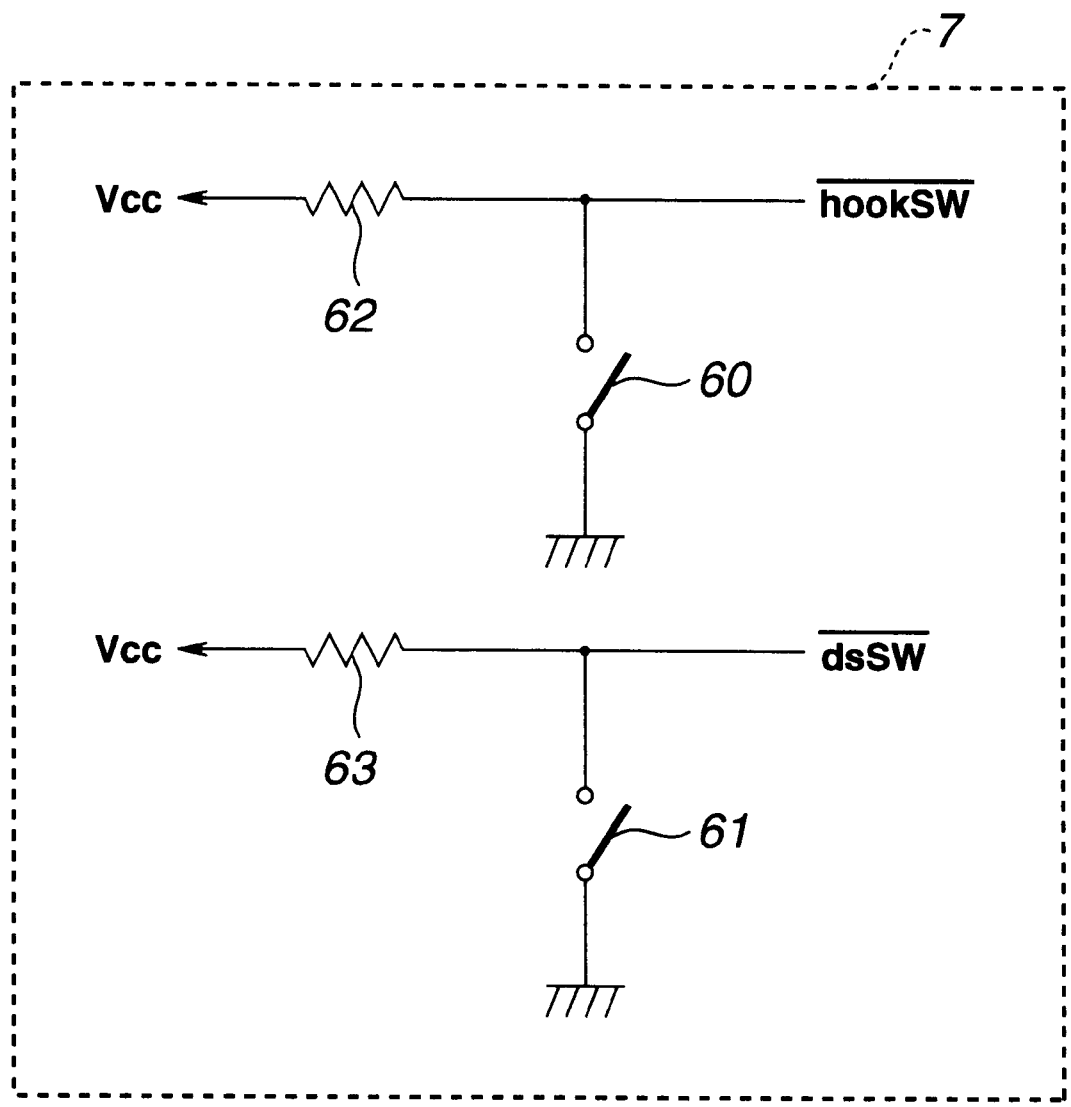
FIG. 5 is a schematic diagram illustrating circuitry of various kinds of switching portions of an operation unit shown in FIG. 1.
Figure 6:
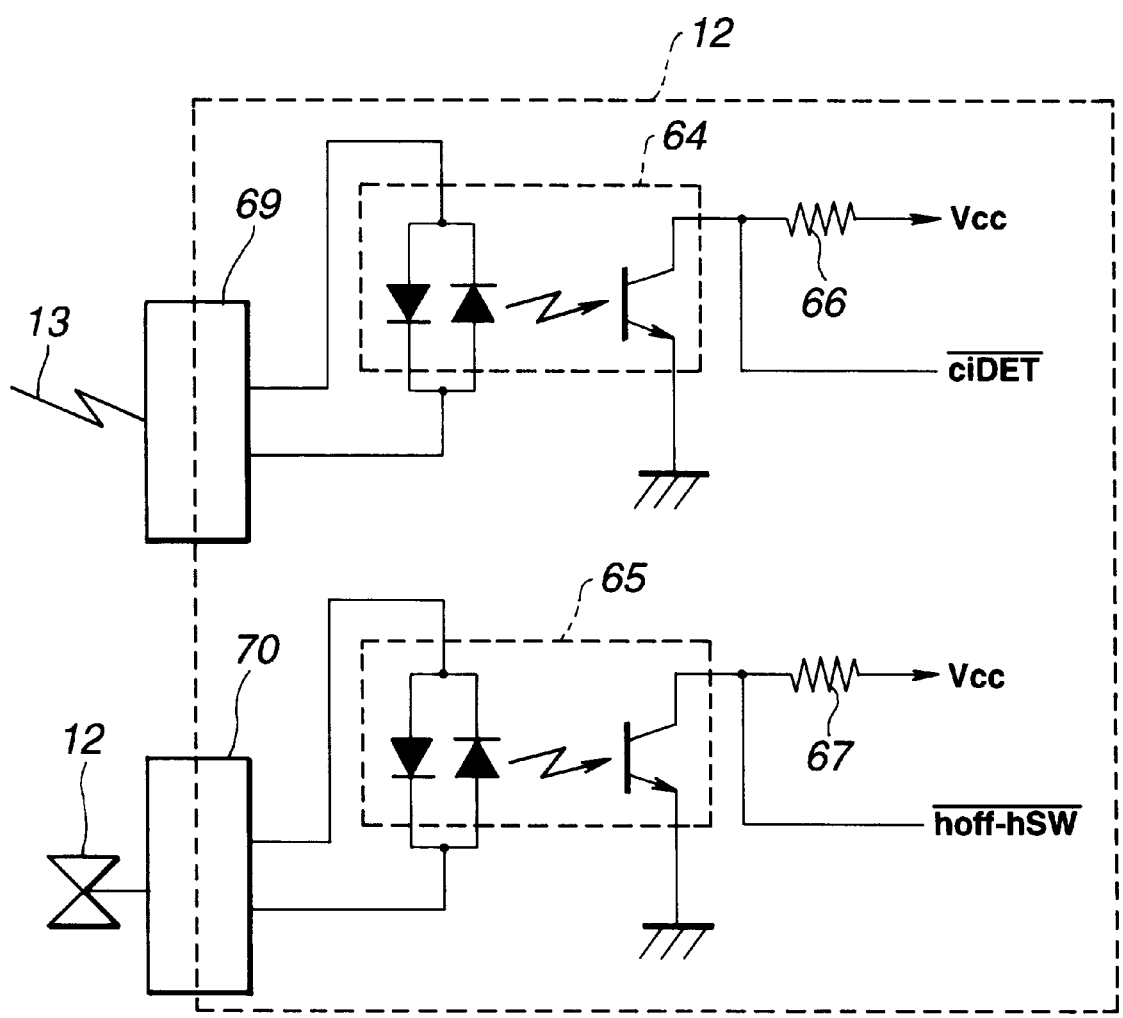
FIG. 6 is a schematic diagram illustrating circuitry of an NCU (network control unit) shown in FIG. 1.

FIG. 2 is a schematic diagram illustrating the configuration of circuitry of the main-power-supply control unit 15. FIG. 3 is a schematic diagram illustrating the configuration of circuitry of the switching power supply 16. FIG. 4 is a schematic diagram illustrating the configuration of circuitry around the CPU 1. FIG. 5 is a schematic diagram illustrating the configuration of various kinds of switching portions of the operation unit 7. FIG. 6 is a schematic diagram illustrating the configuration of circuitry of the NCU 12.

In FIGS. 2 through 6, a power supply voltage $V_{cc}$ is supplied from one of three types of power supplies, i.e., +5 V from the switching power supply 16, a solar cell 23, and a capacitor-type secondary battery 19.

Priority from among the three types of power supplies is determined by the voltage of each of the electric power supplies, a Schottky barrier diode 22 for charging and preventing reverse-current flow of the secondary battery 19, and a diode 26 for preventing reverse-current flow. If $V_{cc}$ is connected to the switching power supply 16, $V_{cc}$ becomes 4.8 V by Zener diodes 18 and 22. If $V_{cc}$ is supplied from the solar cell 23, $V_{cc}$ becomes 4.6 V. If $V_{cc}$ is supplied from the secondary battery 19, $V_{cc}$ becomes 4.5 V of the secondary battery 19 (in a fully charged state).

When the switching power supply 16 operates, priority is given to electric power supply therefrom by setting the performance of the Schottky barrier diode 22 and the diode 26. When the switching power supply 16 operates, it charges the secondary battery 19 and supplies the power supply $V_{cc}$ with electric power. At that time, the output of the solar cell 23 has a lower potential value than the output voltage of the switching power supply 16 by setting of the two diodes 22 and 26, and current does not flow from the solar cell 23 into $V_{cc}$.

When the switching power supply 16 does not operate and the solar cell 23 supplies electric power, i.e., when the switching power supply 16 does not operate but light energy is supplied, electric power is supplied from the secondary battery 19 to the power supply $V_{cc}$ but electric power is not supplied from the solar cell 23 if the potential of the secondary battery 19 is higher than that of the solar cell 23.

On the other hand, if the potential of the secondary battery 19 is lower than that of the solar cell 23, electric power is supplied from the solar cell 23 to the power supply $V_{cc}$, and the secondary battery 19 is also charged through a resistor 20. When the switching power supply 16 does not operate and the solar cell 23 does not supply electric power either, electric power is supplied from the secondary battery 19 to the power supply $V_{cc}$.

In FIG. 2, reference numeral 17 represents a 4-bit one-chip microprocessor, which can operate with very low power consumption and incorporates timer means 17A (to be described later). A counter 17B used when performing a recovery operation of the head of the ink-jet recording apparatus is set in a RAM within the microprocessor 17. Whether or not the solar cell 23 supplies electric power is determined by dividing its potential by resistors 24 and 25 and inputting the divided potential to an input port IN2 of the microprocessor 17.

The voltage of the secondary battery 19 is detected by comparing it with the voltage of a primary battery 28 for backing up the nonvolatile RAM 5 by a comparator 27 via a resistor 21 for stabilizing voltage. The output of the comparator 27 is input to an input port IN4 of the microprocessor 17.

In FIG. 2, resistors 29 and 30 divide the voltage of the primary battery 28. An IC 31 compares a voltage $V_{ac}$ of the secondary side of the switching power supply 16, a +5-V voltage $V_{cc1}$ from the switching power supply 16, and the voltage $V_{cc}$ of the secondary battery 19 with one another. When the volatage $V_{cc1}$ exceeds 2 V, an output port CE assumes an "H (High)" level. When the voltage $V_{ac}$ becomes less than about 2 V, the output port CE assumes an "L (Low)" level. This output is input to an input port IN1 of the microprocessor 17.

When a voltage $Vcc_2$ becomes less than 3 V, an output port RE assumes an "L" level from an "H" level, so that a reset signal is continuously output. When the voltage $V_{cc2}$ exceeds 3 V, the output port RE maintains at an "H" level. This output is input to a RESET port of the microprocessor 17 and the switching power supply 16 via an inverter IC 32 and an OR gate IC 34. This output is also input to a RESET port of the CPU 1 via an AND gate IC 71 shown in FIG. 4.

In FIG. 2, reference numeral 33 represents a NAND gate IC, to which a signal from a hooking switch 60, a mechanical original-detection switch (or lead switch) 61, a ringing-signal detection switch (photocoupler) 64, or a switch (photocoupler) 65 for detecting off-hook of the handset shown in FIG. 5 is input. The output of the NAND gate IC 33 is input to the RESET port of the microprocessor 17 and the switching power supply 16 via the OR gate IC 34.

In FIGS. 5 and 6, reference numerals 62, 63, 66 and 67 represent resistors for adjusting voltage. In FIG. 6, reference numerals 69 and 70 represent modular jacks. An "H" level of an input port IN3 of the microprocessor 17 indicates that the CPU 1 operates. An output from an output port OUT1 of the microprocessor 17 is input to the switching power supply 16 via the OR gate IC 34. An output port OUT2 of the microprocesor 17 outputs a reset signal to the CPU 1 via the AND gate 71. In FIG. 2, reference numeral 35 represents a resistor for voltage adjustment.

In FIG. 3, an AC input is supplied to primary windings of an isolation transformer 39 via a filter circuit 40, a rectifying circuit 41 and a smoothing circuit 42, and is switched by an FET (field-effect transistor) 43. In FIG. 3, reference numeral 36 represents a primary winding, and reference numeral 38 represents a secondary winding. An IC 44 performs oscillation control of the primary side of the isolation transformer 39. A power supply voltage Vdd for the IC 44 is provided by an auxiliary winding 37 wound in the isolation transformer 39.

The secondary side of the isolation transformer 39 supplies power supplies of +24 V and +5 V from the secondary winding 38 to the respective components of the facsimile apparatus via rectifying/smoothing circuits 52 and 53, respectively. In FIG. 3, reference numeral 54 represents a current detection circuit, and reference numeral 55 represents a voltage detection circuit. The outputs of the current detection circuit 54 and the voltage detection circuit 55 are subjected to feedback to the IC 44 via photocouplers 56 and 57, respectively.

The IC 44 performs PWM (pulse-width modulation) control by the current at the secondary side so as to shut-down the entire system when an overvoltage has been detected.

A PS signal, which is peculiar to the present embodiment, is input to the IC 44 via the photocoupler 45. When the PS signal assumes an "H" level, a transistor 46 is turned on to supply current to the photocoupler 45, which performs current-to-voltage conversion to make an input port IN1 of the IC 44 an "L" level. An output port OUT1 of the IC 44 thereby oscillates, whereby the primary side of the isolation transformer 39 oscillates via the FET 43 to supply electric power to the secondary side, whereby the switching power supply 16 starts to operate.

When the PS signal assumes an "L" level, the transistor 46 is turned off, whereby the input port IN1 of the IC 44 assumes an "H" level. The output port OUT1 of the IC 44 thereby assumes an "L" level to turn off the FET 43, whereby the oscillation of the primary side of the isolation transformer 39 is stopped, whereby the operation of the switching power supply 16 is stopped.

In FIG. 3, reference numerals 47, 48, 49, 50 and 51 represents resistors for limiting current, reference numeral 58 represents a diode for preventing reverse current flow, and reference numeral 59 represents a resistor for limiting current. The photocoupler 45 performs isolation between the primary side and the secondary side.

In FIG. 4, a delay circuit 68, comprising resistors and capacitors, outputs signals input to input ports I1–I4 to output ports O1–O4 while delaying the signals by a time period required for initializing the CPU 1.

Next, a description will be provided of the operation of the present embodiment with reference to FIGS. 7 through 12.

Figure 7:
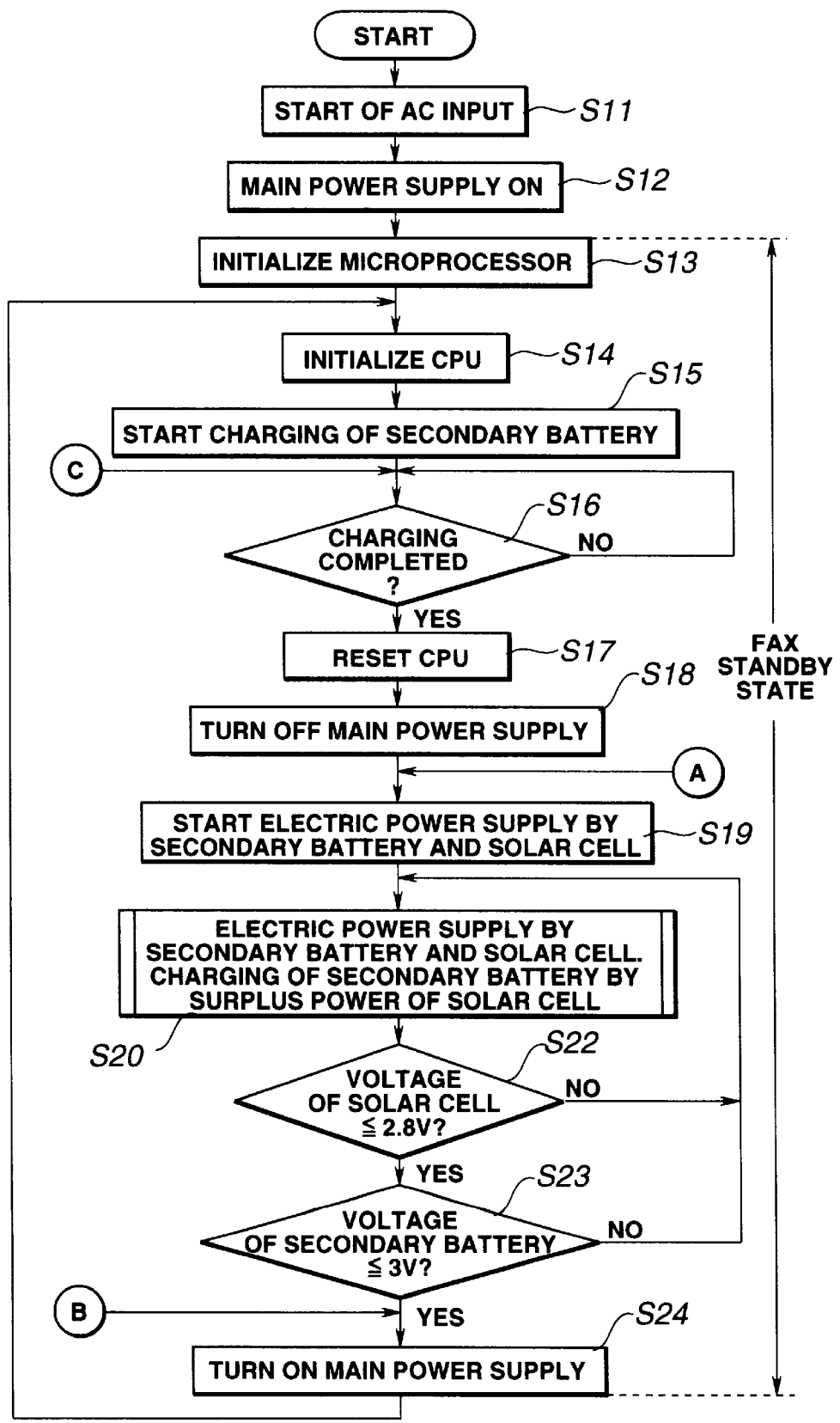
FIG. 7 is a flowchart illustrating the operation of the facsimile apparatus of the first embodiment in a standby state.

FIG. 7 is a flowchart illustrating the operation of the facsimile apparatus of the present embodiment in a standby state.

In FIG. 7, when an AC input has been started (step S11), the switching power supply 16 is first turned on (step S12), the microprocessor 17 is then initialized (step S13), the CPU 1 is initialized (step S14), and charging of the secondary battery 19 is started (step S15). Upon completion of initialization of the microprocessor 17, the facsimile apparatus becomes in a standby state (hereinafter termed a "FAC standby state")

In this standby state, the charging of the secondary battery 19 is continued (a standby charging state). Upon completion of the charging (step S16), i.e., when the output of the comparator 27 becomes an "H" level, the input port IN4 of the microprocessor 17 assumes an "H" level, whereby the microprocessor 17 resets the CPU 1 (step S17) and stops the operation of the switching power supply 16 (step S18), and electric power supply only by the secondary battery 19 and the solar cell 23 is started (steps S19 and S20).

When one hour has elapsed in the timer 17A incorporated in the microprocessor 17, the microprocessor 17 resets the CPU 1 (step S17) and stops the operation of the switching power supply 16 (step S18), and electric power supply only by the secondary battery 19 and the solar cell 23 is started (steps S19 and S20).

In each of the above-described cases, the secondary battery 19 is charged by surplus electric power of the solar cell 23.

When the electric power supplied from the solar cell 23 decreases to a voltage equal to or less than 2.8 V (step S22), and when the secondary battery 19 continues a discharging operation and its voltage becomes equal to or less than 3 V (step S23), the RE port of the IC 31 assumes an "L" level and the PS signal assumes an "H" level, whereby the photocoupler 45 is turned on to make the input port IN1 of the IC 44 an "L" level. The output port OUT1 of the IC 44 thereby oscillates, whereby the primary side of the isolation transformer 39 oscillates via the FET 43 to supply electric power to the secondary side, whereby the switching power supply 16 is turned on (step S24).

The process then returns to step S14, where the CPU 1 is initialized, and charging of the secondary battery 19 is then started. Thus, the secondary battery 19 is charged again while maintaining the FAX standby state. This cycle is repeated.

Figure 8:
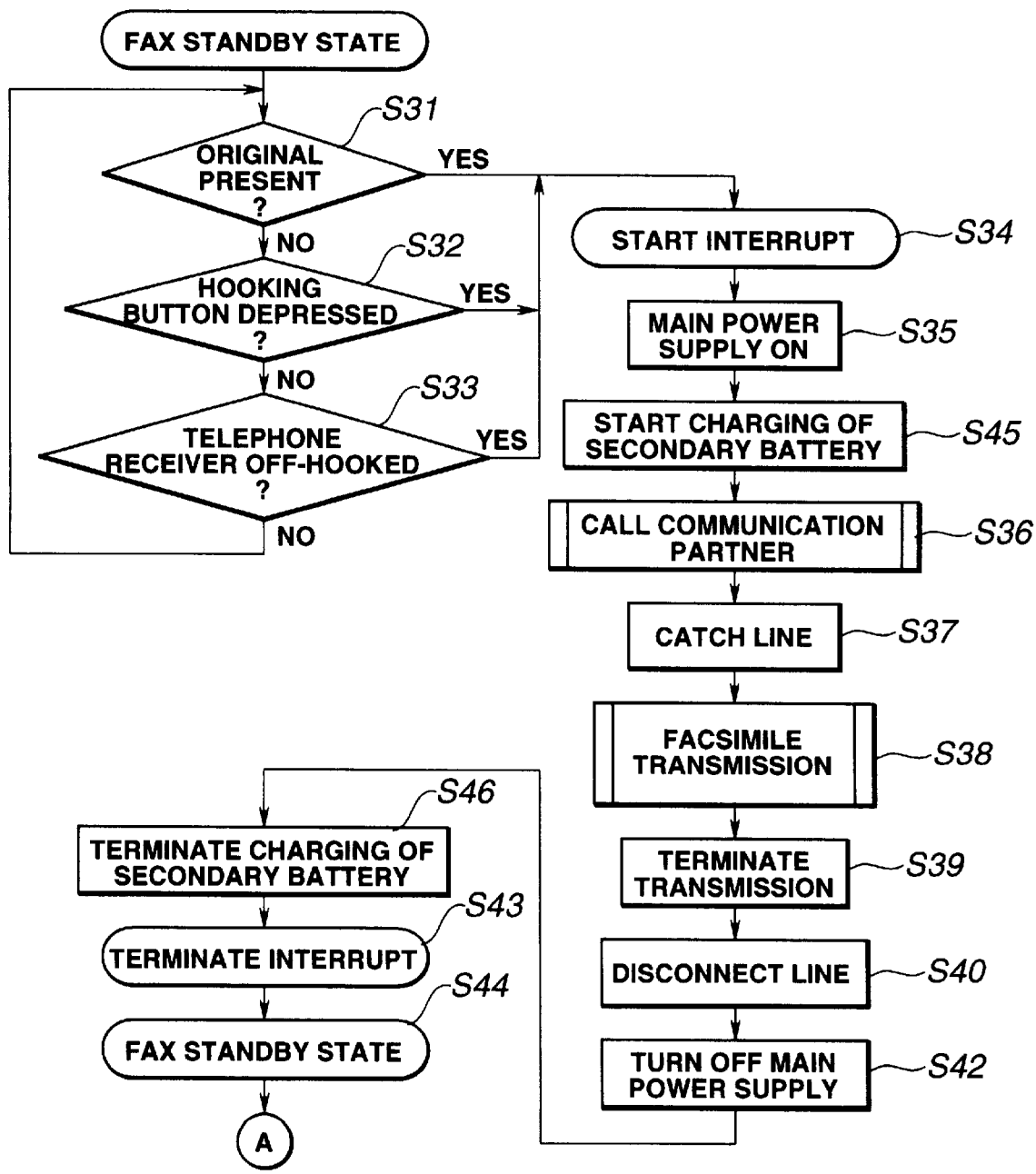
FIG. 8 is a flowchart illustrating an interrupt routine during facsimile transmission in a facsimile standby state.

FIG. 8 is a flowchart illustrating an interrupt routine when facsimile transmission is performed in a FAX standby state.

In FIG. 8, when an original has been set in the FAX standby state (step S31), or when the hooking button has been depressed (step S32), or when the telephone receiver has been off-hooked (step S33), the mechanical original detection switch 61, the hooking switch 60 or the off-hook detection switch 65 is switched on, respectively. An onsignal indicating the on-state is input to the CPU 1 via the delay circuit 68. The on-signal also turns on the photocoupler 45 as a PS signal via the NAND gate IC 33, the OR gate IC 34 and the inverter IC 32 and resets the microprocessor 17 (start of interrupt: step S34).

When the photocoupler 45 has been turned on, the IC 44 causes the primary side of the isolation transformer 39 to oscillate via the FET 43 to supply electric power to the secondary side, whereby the switching power supply 16 is turned on (step S35). When the switching power supply 16 has been turned on, charging of the secondary battery 19 is started (step S45). The secondary battery 19 is always charged while the switching power supply 16 operates. A calling operation is performed to the communication partner's facsimile apparatus in this state (step S36). When the line has been catched (step S37), ordinary facsimile communication can be performed (step S38). Upon completion of transmission (step S39), the line is disconnected (step 40). While the switching power supply 16 operates, the secondary battery 19 is always charged.

When the transmission has been completed and the line has been disconnected, the signal input from the output port OUT1 of the CPU 1 to the input port IN3 of the microprocessor 17 becomes an "L" level from an "H" level, whereby the microprocessor 17 resets the CPU 1, and makes the PS signal an "L" level to stop the operation of the switching power supply 16 (step S42). The charging of the secondary battery 19 is thereby terminated (step S46). Then, the interrupt is terminated (step S43), and a FAX standby state is provided (step S44), and the process returns to A shown in FIG. 7.

Figure 9:
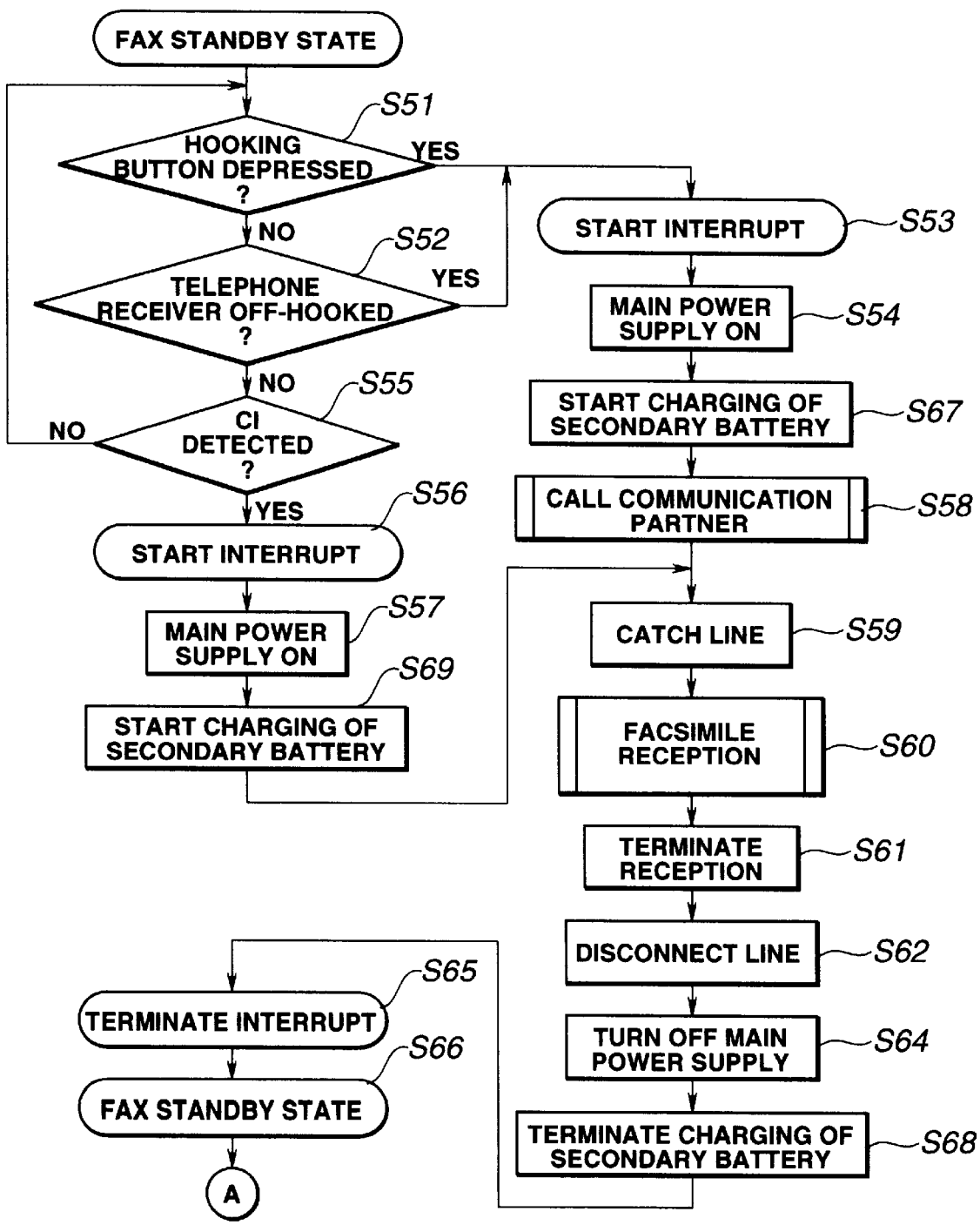
FIG. 9 is a flowchart illustrating an interrupt routine during facsimile reception in a facsimile standby state.

FIG. 9 is a flowchart illustrating an interrupt routine when facsimile reception is performed in a FAX standby state.

In FIG. 9, when the hooking button has been depressed in the FAX standby state (step S51), or when the receiver has been off-hooked (step S52), the hooking switch 60 or the off-hook detection switch 65 is switched on, respectively. An on-signal indicating the on-state is input to the CPU 1 via the delay circuit 68. The on-signal also turns on the photocoupler 45 as a PS signal via the NAND gate IC 33, the OR gate IC 34 and the inverter IC 32, and resets the microprocessor 17 (start of interrupt: step S53). When the photocoupler 45 has been turned on, the IC 44 causes the primary side of the isolation transformer 39 to oscillate via the FET 43 to supply electric power to the secondary side, whereby the switching power supply 16 is turned on (step S54).

When a ringing signal has been detected (step S55), the ringing-signal detection switch 64 is switched on. An on-signal indicating the on-state is input to the CPU 1 via the delay circuit 68. The on-signal also turns on the photocoupler 45 as a PS signal via the NAND gate IC 33, the OR gate IC 34 and the inverter IC 32, and resets the microprocessor 17 (start of interrupt: step S56). When the photocoupler 45 has been turned on, the IC 44 causes the primary side of the isolation transformer 39 to oscillate via the FET 43 to supply electric power to the secondary side, whereby the switching power supply 16 is turned on (step S57). When the switching power supply 16 has been turned on, charging of the secondary battery 19 is started (steps S67 and S69). The secondary battery 19 is always charged while the switching power supply 16 operates.

When the hooking button has been depressed (step S51), or when the receiver has been off-hooked (step S52), a calling operation is performed to the communication partner's facsimile apparatus (step S58). When the line has been catched (step S59), ordinary facsimile reception is performed (step S60).

When a ringing signal has been detected, the NCU 12 catches the line (step S59), and facsimile reception is performed in an automatic reception mode (step S60).

Upon completion of the reception (step S61), the line is disconnected (step S62). In any case, the secondary battery 19 is always charged while the switching power supply 16 operates.

When the reception has been terminated and the line has been disconnected, a signal input from the output port OUT1 of the CPU 1 to the input port IN3 of the microprocessor 17 becomes an "L" level from an "H" level, whereby the microprocessor 17 resets the CPU 1, and makes the PS signal an "L" level to stop the operation of the switching power supply 16 (step S64). The charging of the secondary battery 19 is thereby terminated (step S68). Then the interrupt is terminated (step S65), and a FAX standby state is provided (step S66), and the process returns to A shown in FIG. 7.

Figure 10:
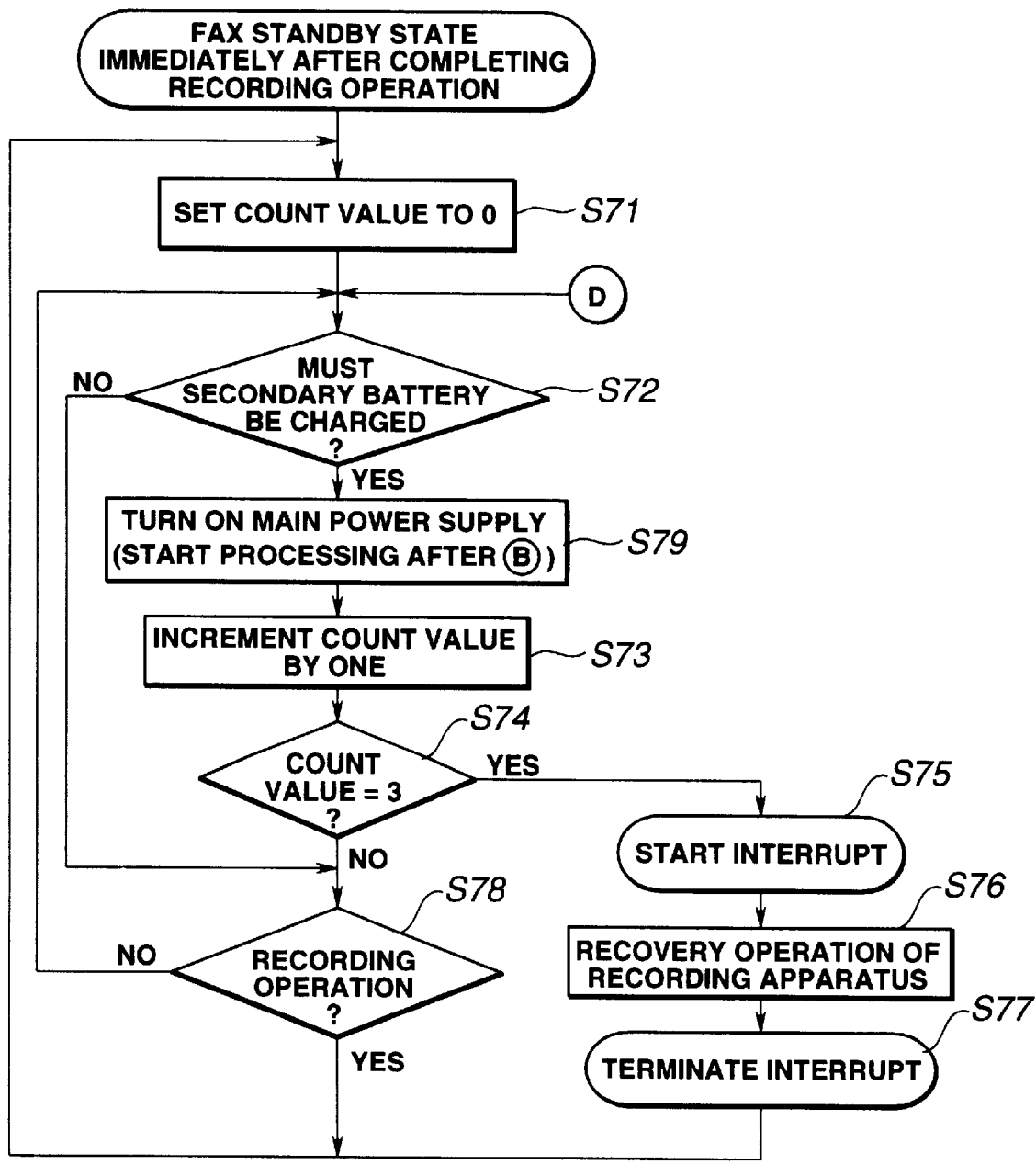
FIG. 10 is a flowchart illustrating an interrupt routine of a recovery operation of an ink-jet recording apparatus in a facsimile standby state.

FIG. 10 is a flowchart illustrating an interrupt routine of a recovery operation of the ink-jet recording apparatus in a FAX standby state.

FIG. 10 illustrates an operational flow for charging the secondary battery 19, or when the switching power supply 16 is not turned on except for operating the ink-jet recording apparatus (for example, when facsimile transmission is not performed for a long time period while remaining in a FAX standby state). FIG. 10 principally shows a case in which the charging cycle of the secondary battery 19 equals 24 hours.

As described above, in the ink-jet recording apparatus of the present embodiment, a recovery operation must be performed at least once in 72 hours, and a recovery operation must always be performed immediately before performing a recording operation. Charging of the secondary battery 19 is so quickly performed that it can be fully charged while the switching power supply 16 operates for facsimile reception.

In FIG. 10, in the FAX standby state immediately after completing a recording operation, the count value of the counter 17B set within the RAM of the microprocessor 17 is set to "0" (step S71). In the FAX standby state, if the voltage of the secondary battery 19 has dropped to equal to or less than 3 V, or if the lapse of 24 hours after the secondary battery 19 has been fully charged and the operation of the switching power supply 16 has been stopped is measured by the timer 17A within the microprocessor 17, it is necessary to charge the secondary battery 19 (step S72). Hence, charging of the secondary battery 19 is performed while maintaining the FAX standby state in accordance with the operational flow at B shown in FIG. 7 (step S79), and the count value of the counter 17B is incremented by one (step S73).

When the count value at that time has reached "3", interrupt is started (step S75), and a recovery operation of the ink-jet recording apparatus is performed (step S76). Upon completion of the recovery operation, the interrupt is terminated (step S77), the count value is set to "0" (step S71), and the process returns to step S72.

When it is unnecessary to charge the secondary battery 19, or when the count value does not equal "3", if a recording operation has been performed in the ink-jet recording apparatus (step S78), the count value is set to "0" (step S71), and the process returns to step S72. When a recording operation is not performed, the count value is not changed, and the process returns to step S72.

Figure 11:
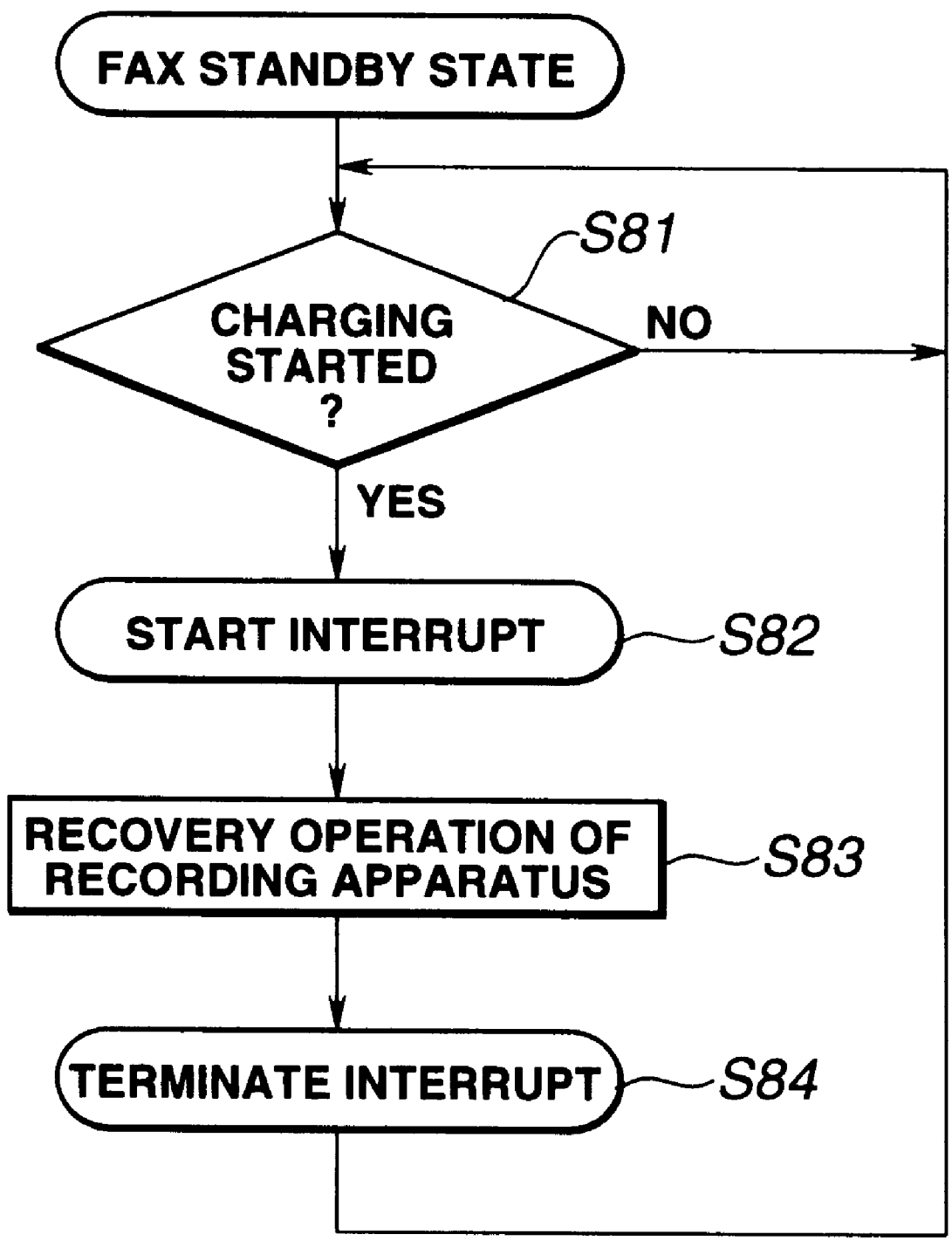
FIGS. 11 and 12 are flowcharts illustrating other interrupt routines of a recovery operation of the ink-jet recording apparatus in a facsimile standby state.

FIG. 11 is a flowchart illustrating another interrupt routine of a recovery operation of the ink-jet recording apparatus in a FAX standby state.

FIG. 11 principally shows a case in which the charging cycle of the secondary battery 19 equals 72 hours, i.e., a case in which the secondary battery 19 must be charged at least once in 72 hours. As in the above-described case, in the ink-jet recording apparatus of the present embodiment, a recovery operation must be performed at least once in 72 hours, and a recovery operation must always be performed immediately before performing a recording operation.

In FIG. 11, in the FAX standby state, when the voltage of the secondary battery 19 has dropped to equal to or less than 3 V, or when the lapse of 72 hours after the operation of the switching power supply 16 has been stopped has been measured by the timer 17A within the microprocessor 17, and charging of the secondary battery 19 has been thereby started (step S81), interrupt is started (step S82), and a recovery operation of the ink-jet recording apparatus is performed (step S83). Upon completion of the recovery operation, the interrupt is terminated (step S84), and the process returns to the FAX standby state.

Figure 12:
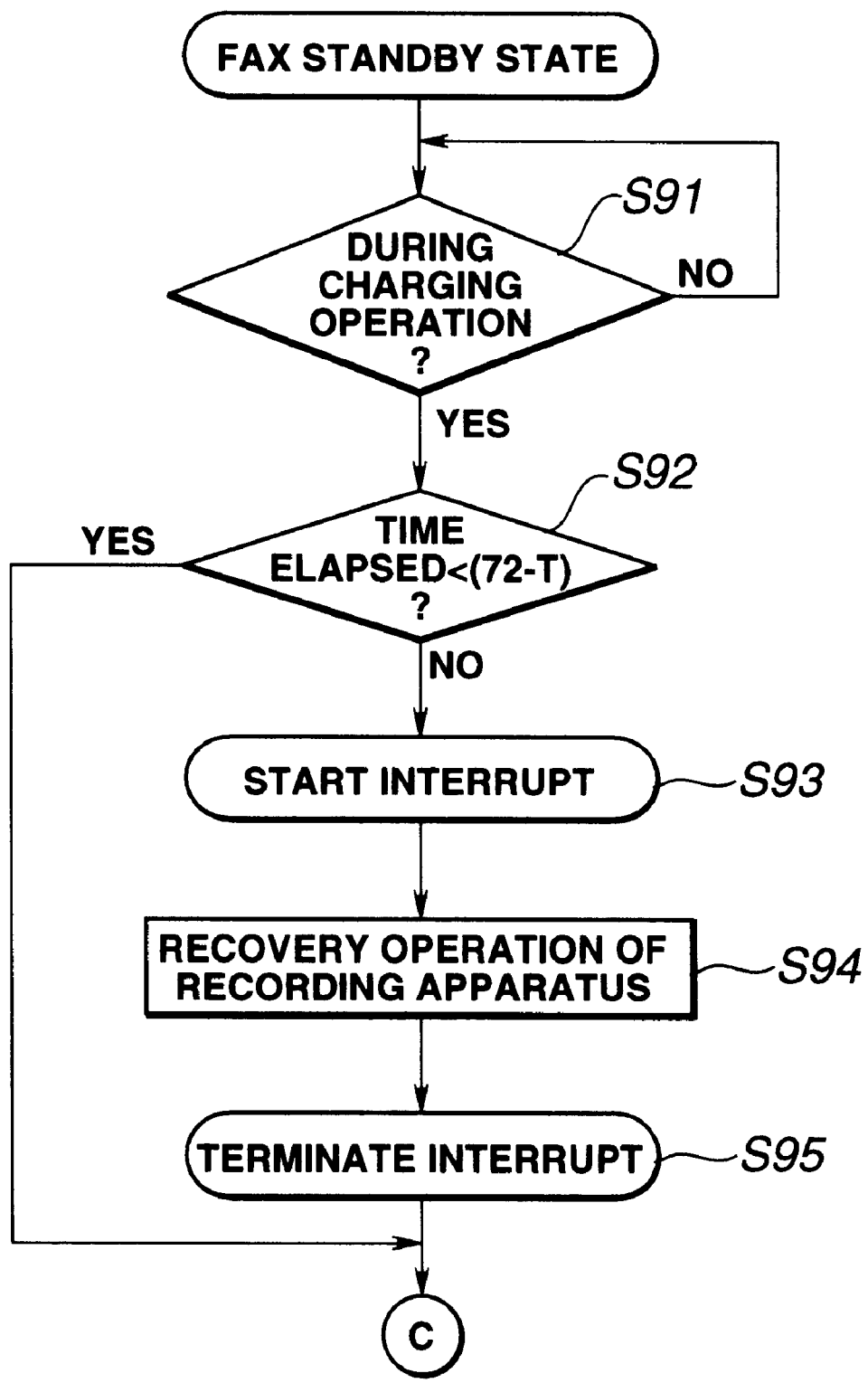

FIG. 12 is a flowchart illustrating another interrupt routine of a recovery operation of the ink-jet recording apparatus in a FAX standby state.

As in the above-described case, in the ink-jet recording apparatus of the present embodiment, a recovery operation must be performed at least once in 72 hours, and a recovery operation must always be performed immediately before performing a recording operation.

In FIG. 12, in the FAX standby state, while the secondary battery 19 is charged (step S91), when the lapse of (72−T) hours after the preceding operation (including a recovery operation) of the switching power supply 16 has been stopped has been measured by the timer 17A within the microprocessor 17 (T=0.5 hours, step S92), interrupt is started (step S93), and a recovery operation of the ink-jet recording apparatus is performed (step S94). Upon completion of the recovery operation, the interrupt is terminated (step S95), and the process returns to the state of waiting for interrupt in the FAX standby state and conforms to the operational flow of C shown in FIG. 7.

When the elapsed time is less than (72−T), the state of waiting for interrupt in the FAX standby state is continued, and the process conforms to the operational flow of C shown in FIG. 7. If the secondary battery 19 is not being charged in the FAX standby state, the FAX standby state is continued.

Second Embodiment

In a second embodiment of the present invention, a description will be provided of only portions different from those in the first embodiment. The same components as those in the first embodiment are indicated by the same reference numerals, and a description thereof will be omitted.

Figure 13:
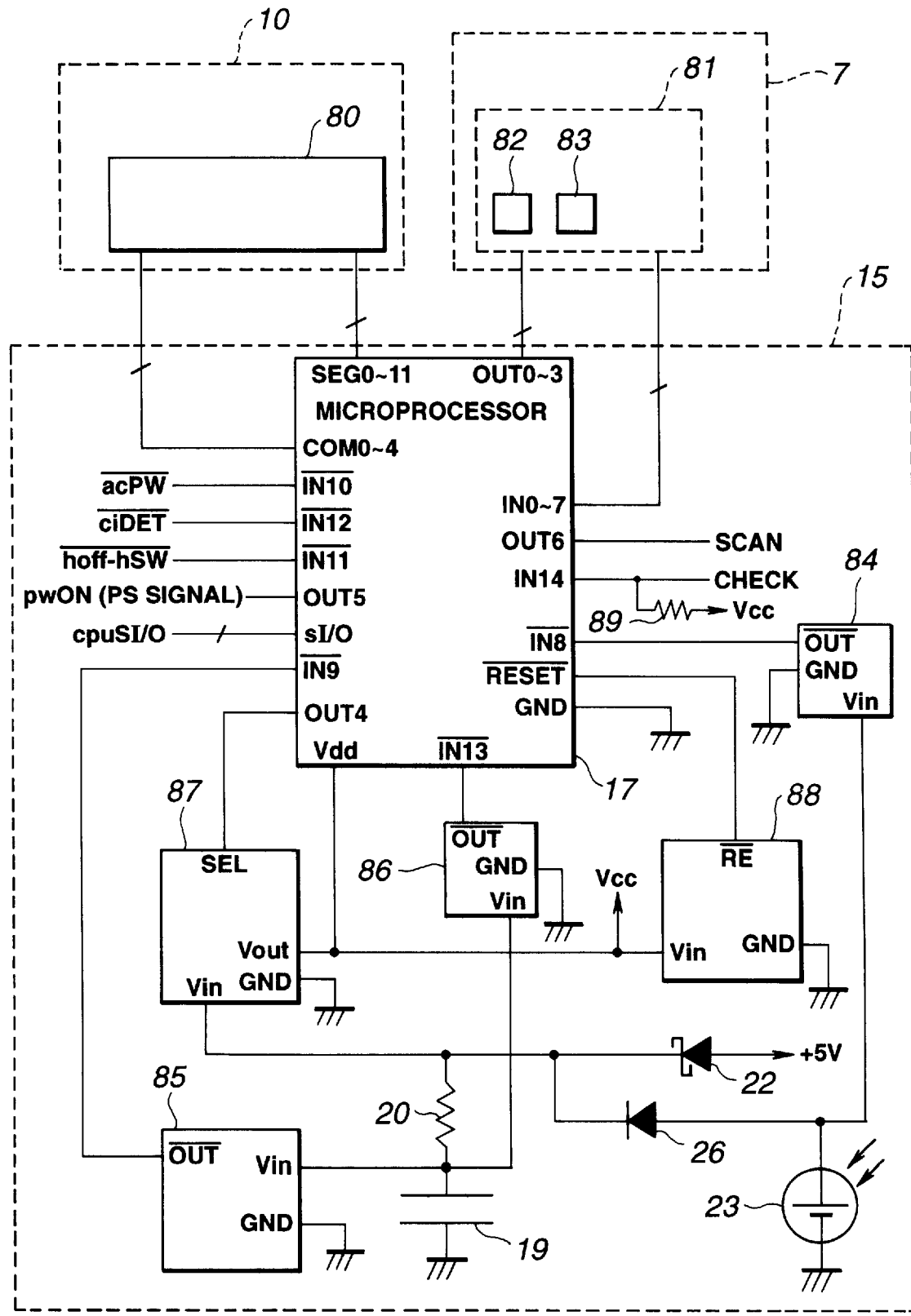
FIG. 13 is a schematic diagram illustrating the configuration of circuitry of a main-power-supply control unit and its environment in a second embodiment of the present invention.
Figure 14:
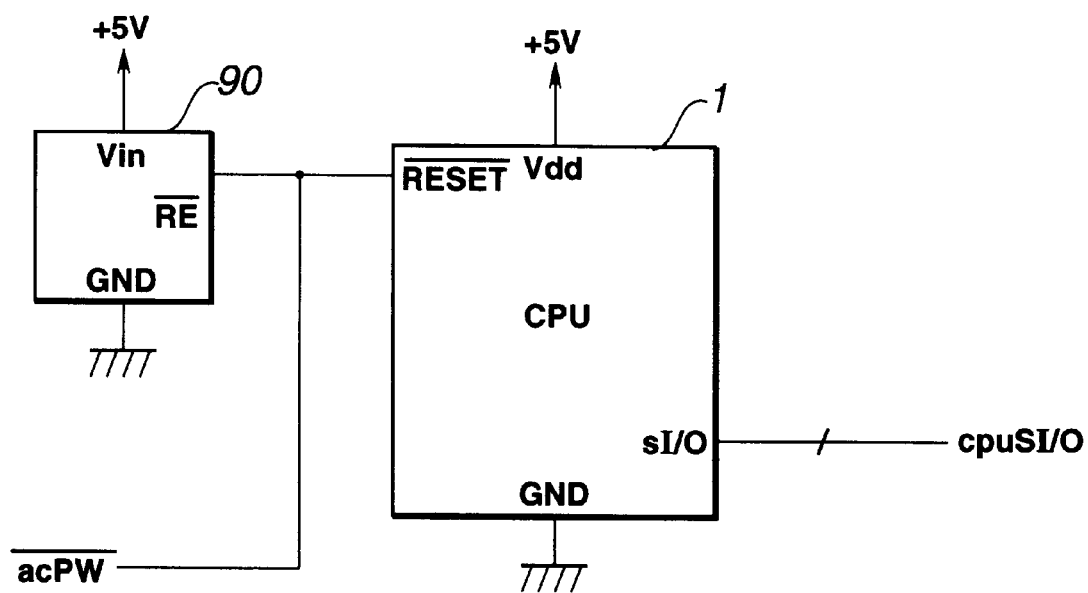
FIG. 14 is a block diagram illustrating the configuration around a CPU in the second embodiment.
Figure 15:
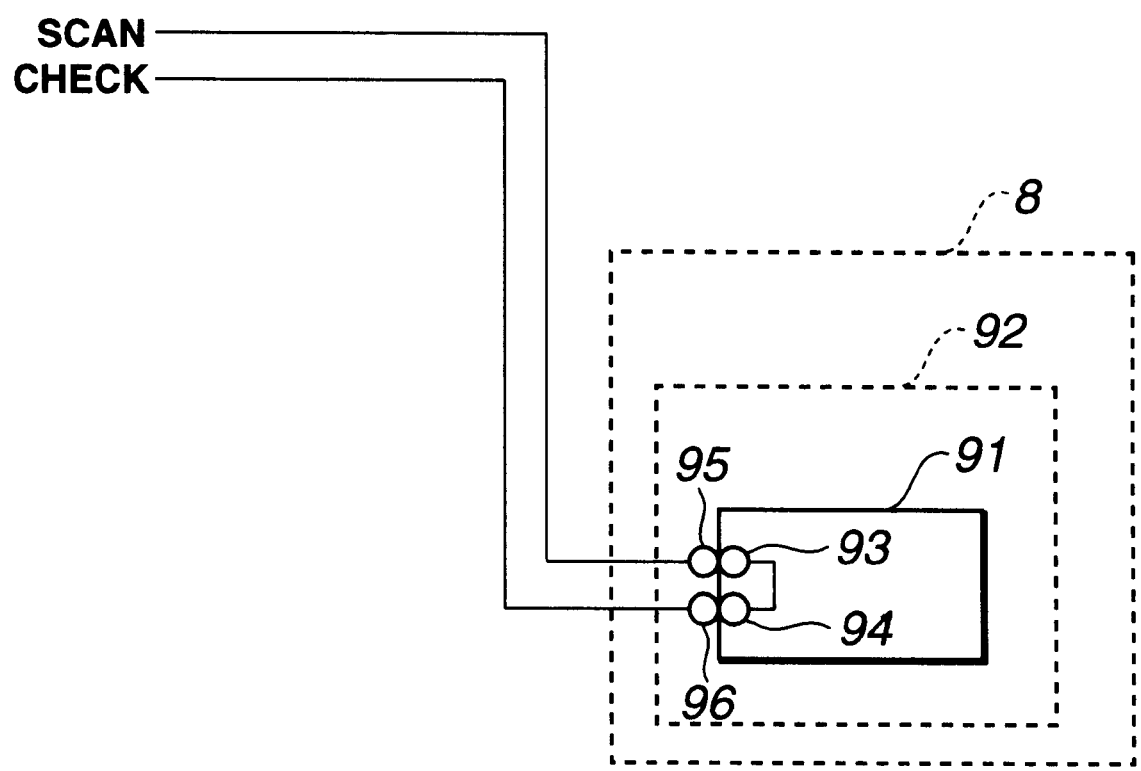
FIG. 15 is a block diagram illustrating the configuration around an ink cartridge in the second embodiment.

FIG. 13 is a schematic diagram illustrating the configuration of the environment of a main-power-supply control unit 15 of the second embodiment. FIG. 14 is a schematic diagram illustrating the configuration of the environment of a CPU 1. FIG. 15 is a diagram illustrating the configuration of the environment of a recording unit 9.

In FIG. 13, a DC-to-DC converter 87 is connected to one of three types of power supplies, i.e., a +5-V output from the switching power supply 16, the solar cell 23, and the capacitor-type secondary battery 19.

Priority from among the three power supplies is the same as that in the first embodiment.

The DC-to-DC converter 87 operates as a series regulator when the input voltage is higher than the output voltage, and operates as a step-up switching regulator + a series regulator when the input voltage is lower than the output voltage. The DC-to-DC converter 87 can select its output voltage from among 5 V and 3 V, and outputs 5 V and 3 V when an input port SEL assumes an "H" level and an "L" level, respectively. The DC-to-DC converter 87 always outputs 5 V or 3 V from its output port $V_{out}$ when its input $V_{in}$ is equal to or higher than 0.9 V.

An 8-bit one-chip microprocessor 17 can operate at very low power consumption, and incorporates timer means.

The microprocessor 17 can exchange data with the CPU 1 via a serial interface sI/O.

Whether or not the solar cell 23 supplies electric power is determined by detecting its voltage by a voltage detection circuit 84. If the voltage is higher than 2.5 V, an output port OUT of the voltage detection circuit 85 becomes an "H" level. If the voltage is lower than 2.5 V, the output port OUT becomes an "L" level. The output from the output port OUT of the voltage detection circuit 85 is input to an input port IN8 of the microprocessor 17.

The voltage of the secondary battery 19 in discharging state is detected by a voltage detection circuit 85. If the voltage is higher than 1.2 V, an output port OUT of the voltage detection circuit 85 assumes an "H" level. If the voltage is lower than 1.2 V, the output port OUT of the voltage detection circuit 85 assumes an "L" level. The output from the output port OUT of the voltage detection circuit 85 is input to an input port IN9 of the microprocessor 17.

The voltage of the secondary battery 19 in a fully charged state is detected by a voltage detection circuit 86. If the voltage is higher than 4.8 V, an output port OUT of the voltage detection circuit 86 becomes an "H" level. If the voltage is lower than 4.8 V, the output port OUT of the voltage detection circuit 86 assumes an "L" level. The output from the output port OUT of the voltage detection circuit 86 is input to an input port IN13 of the microprocessor 17.

A voltage detection circuit 88 resets the microprocessor 17. A signal output from an RE port of the voltage detection circuit 88 is input to a RESET port of the microprocessor 17. When the voltage of an output port Vout of a converter 87 is lower than 2.7 V, the RE port of the voltage detection circuit 88 assumes an "L" level. When the voltage of the output port VOut of the converter 87 exceeds 2.7 V, the microprocessor 17 is reset while the RE port of the voltage detection circuit 88 is maintained at the "L" level for a delayed time period corresponding to the time period required to reset the microprocessor 17 and thereafter becomes an "H" level.

A pictograph LCD (liquid-crystal display) 80 is controlled by the microprocessor 17.

A key matrix circuit 81 performs scanning (for identifying a depressed key) of various kinds of keys (including an original-detection switch) within an operation unit 10. The key matrix circuit 81 can identify a depressed key under software control of the microprocessor 17.

A mechanical original-detection switch (or lead switch) 82 is provided in a conveying channel of an original. The mechanical original-detection switch is used as an original-sensor instead of a photosensor utilizing a light-emitting device so that electric power is not consumed in a state of waiting for insertion of an original. It is thereby possible to prevent power consumption of the secondary battery 19.

A hooking switch 83 performs an off-hook or on-hook operation.

In FIG. 14, a voltage detection circuit 90 resets the CPU 1. A signal output from an RE port of the voltage detection circuit 90 is input to a RESET port of the CPU 1. When a +5-V voltage from the main power supply 16 is lower than 4.5 V, the RE port of the voltage detection circuit 90 assumes an "L" level. When the voltage exceeds 4.5 V, the CPU 1 is reset while the RE port of the voltage detection circuit 90 is maintained at the "L" level for a delayed time period corresponding to the time period required to reset the CPU 1 and thereafter becomes an "H" level. The output from the RE port is also input to an input port IN10 of the microprocessor 17 and is monitored.

In FIG. 13, if a ringing signal arrives via the telephone line 13, a call-reception signal (at an "L" level) is input to an input port IN12 of the microprocessor 17. If a ringing signal arrives in a standby state, a call-reception signal (at an "L" level) is input to the microprocessor 17, which recognizes it and makes an output port OUT5 an "H" level, i.e., makes a PS signal an "H" level, to start the main power supply 16, and transmits that information to the CPU 1 via the serial interface sI/O, whereby the CPU 1 controls the respective blocks.

In FIG. 13, if the telephone set 12 is off-hooked, an "L"-level signal is input to an input port 11 of the microprocessor 17. If the telephone set 12 is off-hooked in a standby state, an "L"-level signal is input the microprocessor 17, which recognizes it and makes the output port OUT5 an "H" level, i.e., makes a PS signal an "H" level, to start the main power supply 16, and transmits that information to the CPU 1 via the serial interface sI/O, whereby the CPU 1 controls the respective blocks.

In FIG. 15, an ink cartridge 91 is detachably mountable. The ink cartridge 91 includes contact terminals 93 and 94 for detecting whether or not it is mounted in a carriage 92. The contact terminals 93 and 94 are short-circuited to each other. The carriage 92 also includes contact terminals 95 and 96, which are connected to the contact terminals 93 and 94, respectively, when the ink cartridge 91 is mounted in the carriage 92.

When an "L"-level signal is output from an output port OUT6 of the microprocessor 17, an input port IN14 of the microprocessor 17 becomes an "L" level when the ink cartridge 91 is mounted in the carriage 92, and the input port IN14 of the microprocessor 17 becomes an "H" level when the ink cartridge 91 is not mounted in the carriage 92.

At that time, if an "L"-level signal is always output from an output port OUT6 of the microprocessor 17, electric power is consumed by a resistor 89 for limiting current, whereby power consumption of the secondary battery 19 is accelerated. Hence, whether or not the ink cartridge 91 is mounted in the carriage 92 is detected by outputting an "L"-level signal from the output port OUT6 of the microprocessor 17 for a time period of 1 msec at an interval of 30 sec from timer means incorporated in the microprocessor 17.

Figure 16:
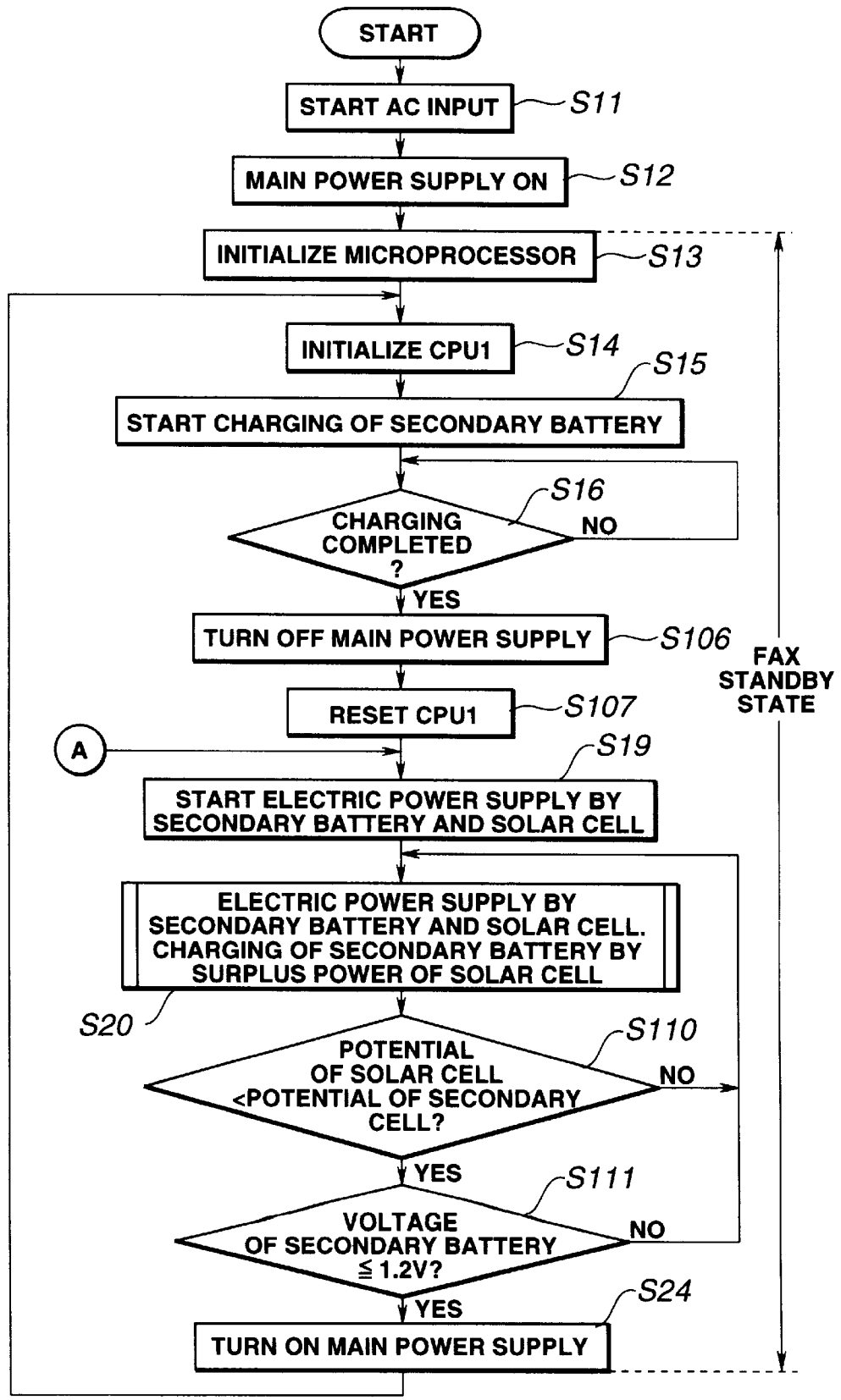
FIG. 16 is a flowchart illustrating the operation of the second embodiment in a facsimile standby state.
Figure 17:
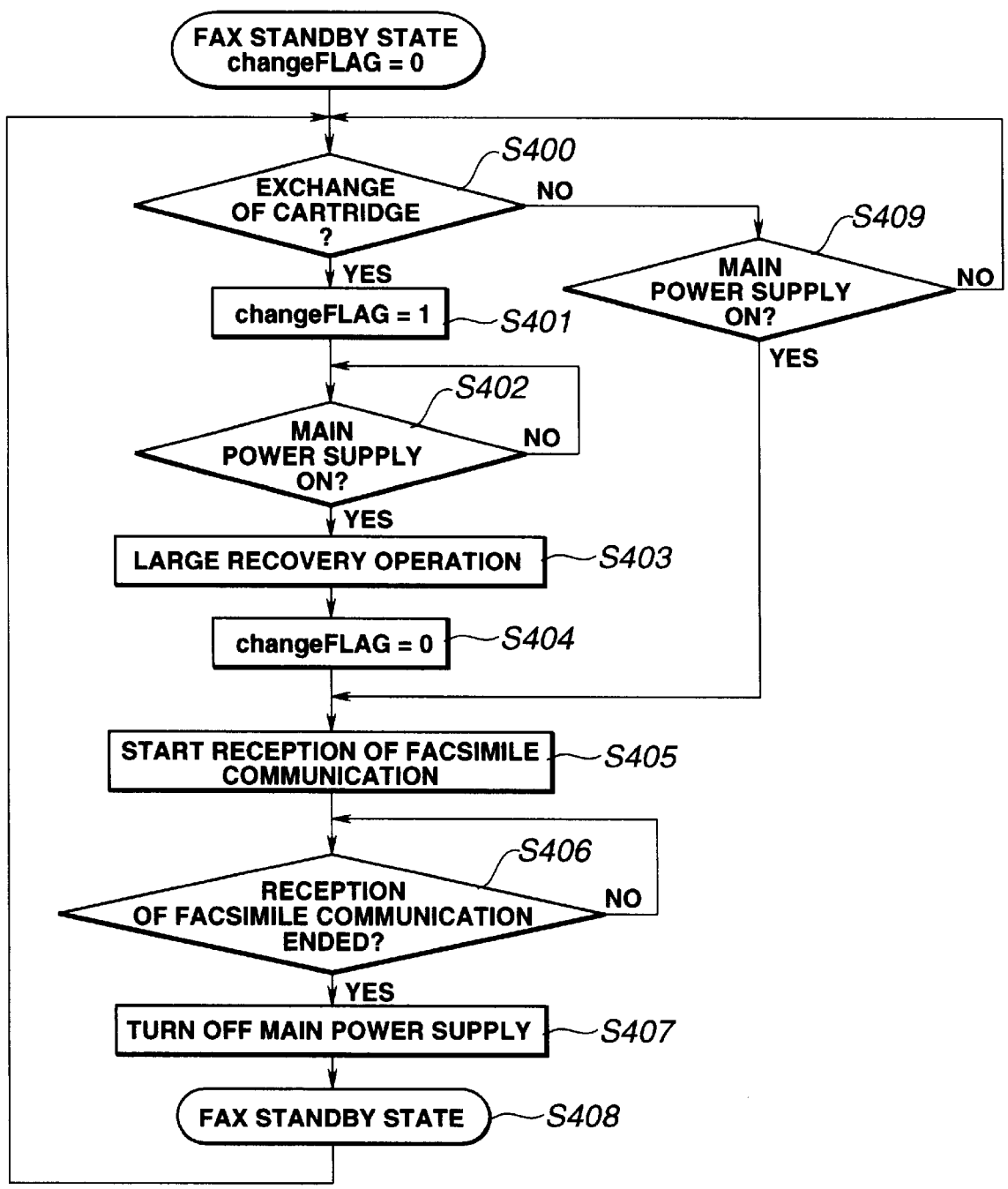
FIG. 17 is a flowchart illustrating detection of presence (exchange) of an ink cartridge in a facsimile standby state in the second embodiment.

FIGS. 16 through 18 are flowcharts illustrating the operation of the present embodiment. The operation of the present embodiment will now be described with reference to FIGS. 16 through 18.

A description will be provided of only steps having different operations between FIGS. 7 and 16. Steps performing the same operations between FIGS. 7 and 16 are indicated by the same step numbers, and a description thereof will be omitted.

When charging has been completed in determination in step S16, i.e., when the output of the voltage detection circuit 86 has become an "H" level, an input port IN13 of the microprocessor 17 becomes an "H" level, whereby the microprocessor 17 makes the output port OUT5, i.e., the PS signal, an "L" level to stop the operation of the main power supply 16 (step S106), whereby the RE port of the voltage detection circuit 90 becomes an "L" level to reset the CPU 1 (step S107).

When one hour has elapsed after the start of charging in the timer incorporated in the microprocessor 17, interrupt occurs, whereby the microprocessor 17 makes the output port OUT5, i.e., the PS signal, an "L" level to stop the operation of the main power supply 16 (step S106), whereby the RE port of the voltage detection circuit 90 becomes an "L" level to reset the CPU 1 (step S107).

When electric power supply from the solar cell has decreased and its potential has become lower than that of the secondary battery 19 (step S110), and when the secondary battery 19 has discharged and its potential has become lower than 1.2 V (step S111), the output port OUT of the voltage detection circuit 85 becomes an "L" level to make the input port IN9 of the microprocessor 17 an "L" level, whereby the microprocessor 17 makes its output port OUT5 an "H" level, i.e., makes the PS signal an "H" level.

FIG. 17 is a flowchart for detecting the presence (exchange) of the ink cartridge 91 in a FAX standby state.

In FIG. 17, in the FAX standby state in which the main power supply 16 does not operate, when the ink cartridge 91 has been exchanged when a changeFLAG=0 (step S400), the changeFLAG is set to become changeFLAG=1 (step S401). When the main power supply 16 has been thereafter turned on caused by start of facsimile reception (step S402), a large recovery operation of the head of the ink cartridge 91 is performed (step S403), and the changeFLAG is reset to become changeFLAG=0 (step S404). Then, a facsimile reception operation is started (step S405). Upon completion of the facsimile reception operation (step S406), the operation of the main power supply 16 is stopped (step S407), and a FAX standby state is provided (step S408). When the ink cartridge 91 has not been exchanged in the FAX standby state in which the main power supply 16 does not operate (step S400), and when the main power supply 16 has thereafter turned on caused by start of facsimile reception (step S409), an ordinary facsimile reception operation is started (step S405). Upon completion of the facsimile reception operation (step S406), the operation of the main power supply 16 is stopped (step S407), and a FAX standby state is provided (step S408). This operation is repeated. While in the present embodiment (shown in FIG. 17), start of facsimile reception has been illustrated as a factor to turn on the main power supply 16, the same operational flow may be performed when the factor to turn on the main power supply 16 relates to a recording operation. When the factor to turn on the main power supply 16 relates to any other operation, a recovery operation of the head of the ink cartridge 91 is not performed even if the main power supply 16 starts while a changeFLAG is set (when changeFLAG=1), in order to prevent excessive discharge of ink. When exchange of the ink cartridge 91 has been detected, the main power supply 16 is not turned on for performing a large recovery operation of the ink cartridge 91, and the large recovery operation is not performed until the next recording operation is executed, in order to prevent wasteful power consumption in a standby state and to realize very low power consumption in the standby state.

FIG. 18 is a flowchart illustrating the timing of ink cartridge detection in a FAX standby state. In the FAX standby state, detection of the presence of the ink cartridge 91 is started by making the output port OUT6 of the microprocessor 17 an "L" level (step S500). After the lapse of 1 msec (step S501), the detection of the presence of the ink cartridge 91 is terminated by making the output terminal OUT6 of the microprocessor 17 an "H" level (step S502). The presence of the ink cartridge 91 can be detected during this 1 msec. Then, after the lapse of 30 sec (step S503), the presence of the ink cartridge 91 is detected again for 1 msec (step S500). The presence of the ink catridge 91 is not detected during this 30 sec, and therefore electric power is not consumed in the resistor 89. By thus setting the detection time and the non-detection time to 1 msec and 30 sec, respectively, and repeating this cycle of detection and non-detection, the presence (mounting) of the ink cartridge 91 in a standby state can be detected while minimizing consumption of the secondary battery 19 by minimizing power consumption without imparing the operability of the apparatus. While the apparatus operates, misdetection of the presence of the ink cartridge 91 can be prevented as much as possible by detecting the presence of the ink cartridge 91 by always making the output port OUT6 of the microprocessor 17 an "L" level.

As described above, while the main power supply 16 operates, the secondary battery 19 is simultaneously charged. Accordingly, the number of times of turning on the main power supply 16 only for charging the secondary battery 19 is reduced, whereby unnecessary power consumption can be prevented.

According to the present embodiment, since the presence (exchange) of the ink cartridge is detected also in a standby state, a recovery operation of the head must be performed while the apparatus operates only when the ink cartridge is detached or mounted in the standby state, whereby wasteful consumption of ink can be prevented.

According to the present embodiment, when the ink cartridge is detached or mounted in a standby state, wasteful consumption of ink can be prevented by performing a large recovery operation only while the apparatus performs a recording operation.

According to the present embodiment, by intermittently detecting the presence (exchange) of the ink cartridge in a standby state, and by making the time period of a non-detection operation greater than that of a detection operation, it is possible to reduce power consumption in the standby state, and thereby to suppress consumption of the secondary battery.

According to the present embodiment, since the presence of the ink cartridge is always detected while the apparatus operates, misdetection can be prevented as much as possible.

The individual components shown in outline or designated by blocks in the drawings are all well known in the facsimile apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A facsimile apparatus comprising:

recording means including an ink-jet recording apparatus for recording image data;

main power supply means for supplying electric power;

central control means, to which electric power is supplied from said main power supply means, for controlling operations of the entire apparatus;

main-power-supply control means for controlling on/off operations of said main power supply means;

secondary battery means, charged by said main power supply means, for supplying said main-power-supply control means with electric power; and discriminating means for discriminating whether said secondary battery means is to be charged;

wherein said apparatus is operable in an operational mode in which said main power supply means is turned on by a starting signal output from said main-power-supply control means, and said main power supply means supplies a main body of said apparatus with electric power and charges said secondary battery means, and a standby mode in which said main power supply means is turned off and said secondary battery means supplies said main-power-supply control means with electric power, wherein said main-power-supply control means selectively starts said main power supply means in accordance with a result of said discriminating means in order to charge said secondary battery means, in the standby mode, and wherein when starting said main power supply means in order to charge said secondary battery means, a recovery operation of the ink-jet recording apparatus is performed.

2. A facsimile apparatus according to claim 1, further comprising solar cell means for supplying said main-power-supply control means with electric power and for charging said secondary battery means in the standby mode.

3. A facsimile apparatus according to claim 2, wherein electric power supply to said main-power-supply control means is performed according to the priority order of said main power supply means, said solar cell means and said secondary battery means.

4. A facsimile apparatus according to claim 1, further comprising detection means for detecting a ringing signal from a telephone line, wherein said main-power-supply control means starts said main power supply means when said detection means has detected a call-reception signal in the standby mode.

5. A facsimile apparatus according to claim 1, wherein said discriminating means comprises voltage detection means for detecting a voltage of said secondary battery means, wherein said main-power-supply control means starts said main power supply means when said voltage detection means has detected that the voltage of said secondary battery means is equal to or less than a predetermined threshold in the standby mode.

6. A facsimile apparatus according to claim 5, wherein when said voltage detection means has detected that the voltage of said secondary battery means exceeds the predetermined threshold when said main power supply means is turned on, said main-power-supply control means stops the operation of said main power supply means and the mode of said apparatus shifts to the standby mode.

7. A facsimile apparatus according to claim 1, wherein said main-power-supply control means further comprises timer means, wherein when said timer means has detected that an elapsed time period of the standby mode has reached a predetermined time period, said main-power-supply control means starts said main power supply means.

8. A facsimile apparatus according to claim 7, wherein when said timer means has detected that an elapsed time period after turning-on of said main power supply means has reached a predetermined time period, said main-power-supply control means turns off said main power supply means and the mode of said apparatus shifts to the standby mode.

9. A facsimile apparatus according to claim 1, wherein said main power supply means comprises a switching power supply.

10. A facsimile apparatus according to claim 1, wherein said main-power-supply control means stops the operation of said main power supply means in response to a command signal from said central control means.

11. A facsimile apparatus according to claim 1, further comprising operation means to be operated by an operator, wherein said main-power-supply control means starts said main power supply means when an operational input from said operation means has been detected in the standby mode, and wherein said central control means controls said facsimile apparatus in accordance with the operational input.

12. A facsimile apparatus according to claim 11, wherein said operation means comprises a switch for detecting an original, at least one switch for starting the operation of said facsimile apparatus, and a switch for detecting off-hook/on-hook of a handset.

13. A facsimile apparatus according to claim 12, wherein said switch for detecting an original comprises a mechanical switch or a lead switch.

14. A facsimile apparatus according to claim 1, wherein said main-power-supply control means further comprises a counter for counting a number of charging operations of said secondary battery means, and wherein when the value of said counter has reached a preset value, the recovery operation of the ink-jet recording apparatus is performed.

15. A facsimile apparatus according to claim 14, wherein said main-power-supply control means resets the value of said counter when the ink-jet recording apparatus starts to operate.

16. A facsimile apparatus comprising:

main power supply means for supplying electric power;

central control means to which electric power is supplied from said main power supply means;

main-power-supply control means for performing on/off control of said main power supply means;

secondary battery means, charged by said main power supply means, for supplying said main-power-supply control means with electric power; and an ink cartridge for recording image data; and cartridge detection means for detecting mounting or detaching of said ink cartridge, wherein said facsimile apparatus is operable in a standby mode in which said main power supply means is turned off and said secondary battery means supplies said main power supply control means with electric power, and an operational mode in which said main power supply means charges said secondary battery means, and wherein said cartridge detection means effects detection in the standby mode.

17. A facsimile apparatus according to claim 16, further comprising solar cell means for supplying said main-power-supply control means with electric power and for charging said secondary battery means in the standby mode.

18. A facsimile apparatus according to claim 17, wherein electric power supply to said main-power-supply control means is performed according to the priority order of said main power supply means, said solar cell means and said secondary battery means.

19. A facsimile apparatus according to claim 16, further comprising ringing-signal detection means for detecting a ringing signal from a telephone line, wherein when the ringing signal has been detected, said main-power-supply control means starts said main power supply means, and said central control means controls said apparatus.

20. A facsimile apparatus according to claim 16, wherein said main-power-supply control means further comprises voltage detection means for detecting a voltage of said secondary battery means, wherein said main-power-supply control means starts said main power supply means to charge said secondary battery means when said voltage detection means has detected that the voltage of said secondary battery means is equal to or less than a predetermined threshold in the standby mode.

21. A facsimile apparatus according to claim 20, wherein when said voltage detection means has detected that the voltage of said secondary battery means exceeds the predetermined threshold while said secondary battery means is charged, said main power supply means is turned off and the mode of said apparatus shifts to the standby mode.

22. A facsimile apparatus according to claim 16, wherein said main-power-supply control means further comprises timer means, wherein when a time period of the standby mode has exceeded a predetermined time period, said main-power-supply control means starts said main power supply means to charge said secondary battery means.

23. A facsimile apparatus according to claim 22, wherein when electric power has been continuously supplied from said main power supply means for a predetermined time period while said secondary battery means has been charged, said main-power-supply control means turns off said main power supply means and the mode of said apparatus shifts to the standby mode.

24. A facsimile apparatus according to claim 16, wherein said main power supply means comprises a switching power supply.

25. A facsimile apparatus according to claim 16, wherein said main-power-supply control means stops the operation of said main power supply means in response to a command signal from said central control means.

26. A facsimile apparatus according to claim 16, further comprising switching means, wherein said main-power-supply control means awaits an input signal from said switching means, and wherein said main-power-supply control means starts said main power supply means when the input signal has been received.

27. A facsimile apparatus according to claim 26, wherein said switching means comprises a switch for detecting an original, at least one switch for starting the operation of said facsimile apparatus, and a switch for detecting off-hook/on-hook of a handset.

28. A facsimile apparatus according to claim 27, wherein said switch for starting the operation comprises at least one of a one-touch key for allowing an operator to telephone to a registered communication partner by depressing the key, a transmission start key, a copy key, and a ten-digit keypad.

29. A facsimile apparatus according to claim 28, wherein said switch for detecting an original comprises a mechanical switch or a lead switch.

30. A facsimile apparatus according to claim 26, wherein when said ink cartridge has been detached or mounted in the standby mode, a recovery operation of a recording head connected to said ink cartridge is performed in the standby mode.

31. A facsimile apparatus according to claim 16, wherein T2 is longer than T1, where T1 represents the time period of the detection of mounting or detaching of said ink cartridge, and T2 represents the time period during which the detection of mounting or detaching of said cartridge is not performed.

32. A facsimile apparatus according to claim 16, wherein detection of mounting or detaching of said ink cartridge is intermittently performed.

33. A facsimile apparatus according to claim 32, wherein the detection of mounting or detaching of said ink cartridge is intermittently performed in the standby state, and wherein the detection of mounting or detaching of said ink cartridge is constantly performed in the operational mode.

34. A recording apparatus comprising:

recording means including an ink-jet recording device for recording data;

first power supply means for supplying electric power to said recording means, said first power supply means having an operational mode in which said first power supply means supplies the power to said recording means, and having a stand-by mode in which said first power supply means does not supply the power to said recording means;

detection means for detecting that said recording means starts recording the data;

power supply control means for controlling the operational mode and the stand-by mode of said first power supply means in accordance with a result of said detection means;

monitoring means for monitoring a time period when the data is not recorded by said recording means while said first power supply means is in the stand-by mode;

second power supply means for supplying electric power to said monitoring means; and control means for controlling said recording means to perform a recovery operation in accordance with time information output by said monitoring means, wherein said first power supply means supplies power to said control means while said first power supply means is in the operational mode, and said second power supply means does not supply power to said control means while said first power supply means is in the stand-by mode.

35. An apparatus according to claim 34, further comprising receiving means for receiving the data, wherein said recording means records the data received by said receiving means.

36. An apparatus according to claim 34, wherein the data comprises image data.

37. An apparatus according to claim 34, wherein said apparatus comprises a facsimile apparatus.

38. An apparatus according to claim 34, wherein said control means controls said recording means to perform the recovery operation when the time period corresponds to a predetermined value.

39. A recording apparatus comprising:

recording means including an ink-jet recording device for recording data and including a changeable ink cartridge;

first power supply means for supplying electric power to said recording means, said first power supply means having an operational mode in which said first power supply means supplies the power to said recording means, and having a stand-by mode in which said first power supply means does not supply the power to said recording means;

monitoring means for monitoring a change of said ink cartridge while said first power supply means is in the stand-by mode;

second power supply means for supplying electric power to said monitoring means; and control means for controlling said recording means to perform a recovery operation in accordance with a monitoring result of said monitoring means, wherein said first power supply means supplies power to said control means while said first power supply means is in the operational mode, and said second power supply means does not supply power to said control means while said first power supply means is in the stand-by mode.

40. An apparatus according to claim 39, further comprising receiving means for receiving the data, wherein said recording means records the data received by said receiving means.

41. An apparatus according to claim 39, wherein the data comprises image data.

42. An apparatus according to claim 39, wherein said apparatus comprises a facsimile apparatus.

43. An apparatus according to claim 39, wherein said control means controls said recording means to perform the recovery operation when the mode of said first power supply means changes from the stand-by mode to the operational mode after said ink cartridge is changed.

44. A method of controlling a facsimile apparatus, said method comprising the steps of:

providing recording means including an ink-jet recording apparatus for recording image data, main power supply means for supplying electric power, central control means, to which electric power is supplied from the main power supply means, for controlling operations of the entire apparatus, main-power-supply control means for controlling on/off operations of the main power supply means, secondary battery means, charged by the main power supply means, for supplying the main-power-supply control means with electric power, and discriminating means for discriminating whether said secondary battery is to be charged;

operating the apparatus in one of an operational mode in which the main power supply means is turned on by a starting signal output from the main-power-supply control means, and the main power supply means supplies a main body of said apparatus with electric power and charges the secondary battery means, and a standby mode in which the main power supply means is turned off and the secondary battery means supplies the main-power-supply control means with electric power;

selectively starting the main power supply means with the main-power-supply control means in accordance with a result of the discriminating means in order to charge the secondary battery means, in the standby mode; and performing a recovery operation of the ink-jet recording apparatus when starting the main power supply means in order to charge the secondary battery means.

45. A method according to claim 44, wherein supplying the main-power-supply control means with electric power and charging the secondary battery means in the standby mode is effected with solar cell means.

46. A method according to claim 45, wherein electric power supply to the main-power-supply control means is performed according t o the priority order of the main power supply means, the solar cell means and the secondary battery means.

47. A method according to claim 44, further comprising the steps of detecting a ringing signal from a telephone line with detection means, and starting the main power supply means with the main-power-supply control means when the detection means has detected a call-reception signal in the standby mode.

48. A method according to claim 44, further comprising the step of detecting a voltage of the secondary battery means with voltage detection means comprising the discriminating means, and starting the main power supply means when the voltage detection means has detected that the voltage of the secondary battery means is equal to or less than a predetermined threshold in the standby mode.

49. A method according to claim 48, further comprising the steps of, when the voltage detection means has detected that the voltage of the secondary battery means exceeds th e predetermined threshold when the main power supply means is turned on, stopping the operation of the main power supply means and shifting the mode of the apparatus to the standby mode.

50. A method according to claim 44, further comprising the step of, when timer means has detected that an elapsed time period of the standby mode has reached a predetermined time period, starting the main power supply means.

51. A method according to claim 50, further comprising the steps of, when the timer means has detected that an elapsed time period after turning-on of the main power supply means has reached a predetermined time period, turning of f the main power supply means and shifting the mode of the apparatus to the standby mode.

52. A method according to claim 44, wherein the main power supply means comprises a switching power supply.

53. A method according to claim 44, further comprising the step of stopping the operation of the main power supply means in response to a command signal from the central control means.

54. A method according to claim 44, further comprising the steps of providing operation means to be operated by an operator, starting the main power supply means with the main-power-supply control means when an operational input from the operation means has been detected in the standby mode, and controlling the facsimile apparatus in accordance with the operational input with the central control means.

55. A method according to claim 54, wherein the operation means comprises a switch for detecting an original, at least one switch for starting the operation of the facsimile apparatus, and a switch for detecting off-hook/on-hook of a handset.

56. A method according to claim 55, wherein the switch for detecting an original comprises a mechanical switch or a lead switch.

57. A method according to claim 44, further comprising the steps of providing a counter for counting a number of charging operations of the secondary battery means, and when the value of the counter has reached a preset value, performing the recovery operation of the ink-jet recording apparatus.

58. A method according to claim 57, further comprising the step of resetting the value of the counter when the ink-jet recording apparatus starts to operate.

59. A method of controlling a facsimile apparatus, said method comprising the steps of:
providing main power supply means for supplying electric power, central control means to which electric power is supplied from the main power supply means, main-power-supply control means for performing on/off control of the main power supply means, secondary battery means, charged by the main power supply means, for supplying the main-power-supply control means with electric power, an ink cartridge for recording image data, and cartridge detection means for detecting mounting or detaching of the ink cartridge;
operating the facsimile apparatus in one of a standby mode in which the main power supply means is turned off and the secondary battery means supplies the main power supply control means with electric power, and an operational mode in which the main power supply means charges the secondary battery means; and
effecting detection with the cartridge detection means in the standby mode.

60. A method according to claim 59, wherein supplying the main-power-supply control means with electric power and charging the secondary battery means in the standby mode is effected with solar cell means.

61. A method according to claim 60, wherein electric power supply to the main-power-supply control means is performed according to the priority order of the main power supply means, the solar cell means and the secondary battery means.

62. A method according to claim 59, further comprising the steps of providing ringing-signal detection means for detecting a ringing signal from a telephone line and starting the main power supply means with the main-power-supply control means when the ringing signal has been detected.

63. A method according to claim 59, further comprising the step of starting the main power supply means with the main-power-supply control means to charge the secondary battery means when the voltage detection means has detected that the voltage of the secondary battery means is equal to or less than a predetermined threshold in the standby mode.

64. A method according to claim 63, further comprising the steps of, when the voltage detection means has detected that the voltage of the secondary battery means exceeds the predetermined threshold while the secondary battery means is charged, turning off the main power supply means and shifting the mode of the apparatus to the standby mode.

65. A method according to claim 59, further comprising the step of, when a time period of the standby mode has exceeded a predetermined time period, starting the main power supply means to charge the secondary battery means.

66. A method according to claim 65, further comprising the steps of, when electric power has been continuously supplied from the main power supply means for a predetermined time period while the secondary battery means has been charged, turning off the main power supply means and shifting the mode of the apparatus to the standby mode.

67. A method according to claim 59, wherein the main power supply means comprises a switching power supply.

68. A method according to claim 59, further comprising the step of stopping the operation of the main power supply means in response to a command signal from the central control means.

69. A method according to claim 59, further comprising the step of starting the main power supply means with the main-power-supply control means when an input signal from switching means has been received.

70. A method according to claim 69, wherein the switching means comprises a switching for detecting an original, at least one switch for starting the operation of the facsimile apparatus, and a switch for detecting off-hook/on-hook of a handset.

71. A method according to claim 70, wherein the switch for starting the operation comprises at least one of a one-touch key for allowing an operator to telephone to a registered communication partner by depressing the key, a transmission start key, a copy key, and a ten-digit keypad.

72. A method according to claim 71, wherein the switch for detecting an original comprises a mechanical switch or a lead switch.

73. A method according to claim 69, further comprising the step of, when the ink cartridge has been detached or mounted in the standby mode, performing a recovery operation of a recording head connected to the ink cartridge in the standby mode.

74. A method according to claim 59, wherein T2 is longer than T1 where T1 represents the time period of the detection of mounting or detaching of the ink cartridge, and T2 represents the time period during which the detection of mounting or detaching of the cartridge is not performed.

75. A method according to claim 59, wherein said step of effecting detection of mounting or detaching of the ink cartridge is intermittently performed.

76. A method according to claim 75, wherein steps of effecting detection of mounting or detaching of the ink cartridge is intermittently performed in the standby mode, and is constantly performed in the operational mode.

77. A method of controlling a recording apparatus, said method comprising the steps of:
providing recording means including an ink-jet recording device for recording data, first power supply means for supplying electric power to the recording means, the first power supply means having an operational mode in which the first power supply means supplies the power to the recording means, and having a stand-by mode in which the first power supply means does not supply the power to the recording means, second power supply means, detection means for detecting that the recording means starts recording the data, and power supply control means for controlling the operational mode and the stand-by mode of the first power supply means in accordance with a result of the detection means; and
monitoring with monitoring means a time period when the data is not recorded by the recording means while the first power supply means is in the stand-by mode, the second power supply means for supplying electric power to the monitoring means; and
controlling the recording means with control means to perform a recovery operation in accordance with time information output by the monitoring means, wherein the first power supply means supplies power to the control means while the first power supply means is in the operational mode, and the second power supply means does not supply power to the control means while the first power supply means is in the stand-by mode.

78. A method according to claim 77, further comprising the step of receiving the data,
wherein the recording means records the data received in said receiving step.

79. A method according to claim 77, wherein the data comprises image data.

80. A method according to claim 77, wherein the apparatus comprises a facsimile apparatus.

81. A method according to claim 77, wherein the control means controls the recording means to perform the recovery operation when the time period corresponds to a predetermined value.

82. A method of controlling a recording apparatus, said method comprising the steps of:
providing recording means including an ink-jet recording device for recording data and including a changeable ink cartridge, first power supply means for supplying electric power to the recording means, the first power supply means having an operational mode in which the first power supply means supplies the power to the recording means, and having a stand-by mode in which the first power supply means does not supply the power to the recording means, and second power supply means;
monitoring with monitoring means a change of the ink cartridge while the first power supply means is in the stand-by mode, the second power supply means for supplying electric power to the monitoring means; and
controlling said recording means with control means to perform a recovery operation in accordance with a monitoring result in said monitoring step,
wherein the first power supply means supplies power to the control means while the first power supply means is in the operational mode, and the second power supply means does not supply power to the control means while the first power supply means is in the stand-by mode.

83. A method according to claim 82, further comprising the step of receiving the data, wherein the recording means records the data received in said receiving step.

84. A method according to claim 82, wherein the data comprises image data.

85. A method according to claim 82, wherein the apparatus comprises a facsimile apparatus.

86. A method according to claim 82, wherein the control means controls the recording means to perform the recovery operation when the mode of the first power supply means changes from the stand-by mode to the operational mode after the ink cartridge is changed.

87. A recording apparatus comprising:
recording means including an ink-jet recording device for recording data;
first power supply means for supplying electric power to said recording means, said first power supply means having an operational mode in which said first power supply means supplies the power to said recording means, and having a stand-by mode in which said first power supply means does not supply the power to said recording means;
discrimination means for discriminating whether a recovery operation is to be performed while said first power supply means is in the stand-by mode;
second power supply means for supplying electric power to said discrimination means; and
control means for causing said first power supply means to change from the stand-by mode to the operational mode in accordance with a discrimination result output by said discrimination means, and for controlling said recording means to perform the recovery operation, wherein said first power supply means supplies power to said control means while said first sower supply means is in the operational mode, and said second power supply means does not supply power to said control means while said first power supply means does means is in the stand-by mode.

88. An apparatus according to claim 87, further comprising receiving means for receiving the data, wherein said recording means records the data received by said receiving means.

89. An apparatus according to claim 87, wherein the data comprises image data.

90. An apparatus according to claim 87, wherein said apparatus comprises a facsimile apparatus.

91. An apparatus according to claim 87, wherein said control means controls said recording means to perform the recovery operation when a time period when the data is not recorded by said recording means corresponds to a predetermined value.

92. An apparatus according to claim 87, wherein said control means causes said first power supply means to change the mode using the electric power from said second power supply means.

93. An apparatus according to claim 92, wherein said control means controls said recording means to perform the recovery operation using the electric power from said first supply means.

94. A method of controlling a recording apparatus, said method comprising the steps of:
providing recording means including an ink-jet recording device for recording data, first power supply means for supplying electric power to the recording means, the first power supply means having an operational mode in which the first power supply means supplies the power to the recording means, and having a stand-by mode in which the first power supply means does not supply the power to the recording means, and second power supply means;
discriminating with discrimination means whether a recovery operation is to be performed while the first power supply means is in the stand-by mode, the second power supply means supplying electric power to the discrimination means; and
causing with control means the first power supply means to change from the stand-by mode to the operational mode in accordance with a discrimination result output by the discrimination means, and controlling the recording means to perform the recovery operation, wherein the first power supply means supplies power to the control means while the first power supply means is in the operational mode, and the second power supply means does not supply power to the control means while the first power supply means is in the stand-by mode.

95. A method according to claim 94, further comprising the step of receiving the data, wherein the recording means records the data received in said receiving step.

96. A method according to claim 94, wherein the data comprises image data.

97. A method according to claim 94, wherein the apparatus comprises a facsimile apparatus.

98. A method according to claim 94, wherein the control means controls the recording means to perform the recovery operation when a time period when the data is not recorded by the recording means corresponds to a predetermined value.

99. A method according to claim 94, wherein the control means causes the first power supply means to change the mode using the electric power from the second power supply means.

100. A method according to claim 99, wherein said control means controls the recording means to perform the recovery operation using the electric power from the first supply means.

101. A recording apparatus comprising:

recording means including an ink-jet recording device for recording data;

first power supply means for supplying electric power to said recording means, said first power supply means having an operational mode in which said first power supply means supplies the power to said recording means, and a stand-by mode in which said first power supply means does not supply the power to said recording means;

detection means for detecting that said recording means starts recording the data;

monitoring means for monitoring a time period when the data is not recorded by said recording means while said first power supply means is in the stand-by mode;

second power supply means for supplying electric power to said monitoring means; and control means for controlling the operational mode and the stand-by mode of said first power supply means in accordance with a result of said detection means, and for controlling said recording means to perform a recovery operation in accordance with time information output by said monitoring means, wherein said first power supply means supplies power to said control means while said first power supply means is in the operational mode, and said second power supply means does not supply power to said control means while said first power supply means is in the stand-by mode.

102. An apparatus according to claim 101, further comprising receiving means for receiving the data, wherein said recording means records the data received by said receiving means.

103. An apparatus according to claim 101, wherein the data comprises image data.

104. An apparatus according to claim 101, wherein said apparatus comprises a facsimile apparatus.

105. An apparatus according to claim 101, wherein said control means controls said recording means to perform the recovery operation when the time period corresponds to a predetermined value.

106. A recording apparatus comprising:

recording means including an ink-jet recording device for recording data and including a changeable ink cartridge;

first power supply means for supplying electric power to said recording means, said first power supply means having an operational mode in which said first power supply means supplies the power to said recording means, and having a stand-by mode in which said first power supply means does not supply the power to said recording means;

detection means for detecting that said recording means starts recording the data;

monitoring means for monitoring a change of said ink cartridge while said first power supply means is in the stand-by mode;

second power supply means for supplying electric power to said monitoring means; and control means for controlling the operational mode and the stand-by mode of said first power supply means in accordance with a result of said detection means, and for controlling said recording means to perform a recovery operation in accordance with a monitoring result of said monitoring means, wherein said first power supply means supplies power to said control means while said first power supply means is in the operational mode, and said second power supply means does not supply power to said control means while said first power supply means is in the stand-by mode.

107. An apparatus according to claim 106, further comprising receiving means for receiving the data, wherein said recording means records the data received by said receiving means.

108. An apparatus according to claim 106, wherein the data comprises image data.

109. An apparatus according to claim 106, wherein said apparatus comprises a facsimile apparatus.

110. An apparatus according to claim 106, wherein said control means controls said recording means to perform the recovery operation when the mode of said power supply means changes from the stand-by mode to the operational mode after said ink cartridge is changed.

111. A recording method for recording data with recording means including an ink-jet recording device, said method comprising the steps of:

supplying electric power to the recording means in an operational mode in which first power supply means supplies the power to the recording means and not supplying electric power in a stand-by mode in which the first power supply means does not supply the power to the recording means;

detecting that the recording means starts recording the data;

monitoring with monitoring means a time period when the data is not recorded by the recording means while the first power supply means is in the stand-by mode, the monitoring means being supplied with power by second power supply means; and controlling with control means the operational mode and the stand-by mode of the first power supply means in accordance with a result of said detecting step, and controlling the recording means to perform a recovery operation in accordance with time information output in said monitoring step, wherein the first power supply means supplies power to the control means while the first power supply means is in the operational mode, and the second power supply means does not supply power to the control means while the first power supply means is in the stand-by mode.

112. A method according to claim 111, further comprising the step of receiving the data, wherein the recording means records the data received in said receiving step.

113. A method according to claim 111, wherein the data comprises image data.

114. A method according to claim 111, wherein said method is effected in a facsimile apparatus.

115. A method according to claim 111, wherein said controlling step controls the recording means to perform the recovery operation when the time period corresponds to a predetermined value.

116. A method for recording data with recording means including an ink-jet recording device including a changeable ink cartridge, said method comprising the steps of:

supplying electric power to the recording means in an operational mode in which first power supply means supplies the power to the recording means, and not supplying electric power in a stand-by mode in which the first power supply means does not supply the power to the recording means;

detecting that the recording means starts recording the data;

monitoring with monitoring means a change of the ink cartridge while the power supply means is in the stand-by mode, the monitoring means being supplied with sower by second power supply means; and controlling with control means the operational mode and the stand-by mode of the first power supply means in accordance with a result of said detecting step, and controlling the recording means to perform a recovery operation in accordance with a monitoring result of said monitoring step, wherein the first power supply means supplies sower to the control means while the first power supply means is in the operational mode, and the second power supply means does not supply power to the control means while the first power supply means is in the stand-by mode.

117. A method according to claim 116, further comprising the step of receiving the data, wherein the recording means records the data received in said receiving step.

118. A method according to claim 116, wherein the data comprises image data.

119. A method according to claim 116, wherein said method is effected in a facsimile apparatus.

120. A method according to claim 116, wherein said controlling step controls the recording means to perform the recovery operation when the mode of the power supply means changes from the stand-by mode to the operational mode after the ink cartridge is changed.

* * * * *

UNITED STATES PATENT AND TRADEMARK OFFICE
CERTIFICATE OF CORRECTION

PATENT NO. : 6,055,068

DATED : April 25, 2000

INVENTOR(S) : ABE ET AL.

It is certified that error appears in the above-identified patent and that said Letters Patent is hereby corrected as shown below:

COLUMN 4:
 Line 7, "onsignal" should read --on-signal--.
 Line 13, "binarycoding" should read --binary-coding--.

COLUMN 6:
 Line 6, "volatage" should read --voltage--.

COLUMN 7:
 Line 13, "represents" should read --represent--.
 Line 36, "state")" should read --state").--.

COLUMN 8:
 Line 13, "onsignal" should read --on-signal--.
 Line 29, "catched" should read --caught--.

COLUMN 9:
 Line 13, "catched" should read --caught--.

COLUMN 11:
 Line 57, "Vout" should read --$V_{out}$--.
 Line 60, "VOut" should read --$V_{out}$--.

COLUMN 12:
 Line 1, "Akey" should read --A key--.
 Line 40, "input the" should read --input to the--.

COLUMN 13:
 Line 45, "caused by" should read --due to--.
 Line 56, "caused by" should read --due to--.

UNITED STATES PATENT AND TRADEMARK OFFICE
CERTIFICATE OF CORRECTION

PATENT NO. : 6,055,068

DATED : April 25, 2000

INVENTOR(S) : ABE ET AL.

It is certified that error appears in the above-identified patent and that said Letters Patent is hereby corrected as shown below:

COLUMN 20:
  Line 14, "t o the" should read --to the--.
  Line 31, "th" should be deleted.
  Line 32, "e" should read --the--.
  Line 44, "of f the" should read --of the--.

COLUMN 22:
  Line 34, "steps" should read --said step--.

COLUMN 24:
  Line 5, "sower" should read --power--.
  Line 8, "does" should be deleted.
  Line 9, "means" should be deleted.

COLUMN 27:
  Line 10, "sower" should read --power--.
  Line 17, "sower" should read --power--.

Signed and Sealed this

Twenty-second Day of May, 2001

Attest:

NICHOLAS P. GODICI

*Attesting Officer*   Acting Director of the United States Patent and Trademark Office